March 9, 1943.  C. M. KENDRICK ET AL  2,313,246
FLUID PRESSURE DEVICE
Filed May 31, 1941  6 Sheets-Sheet 1
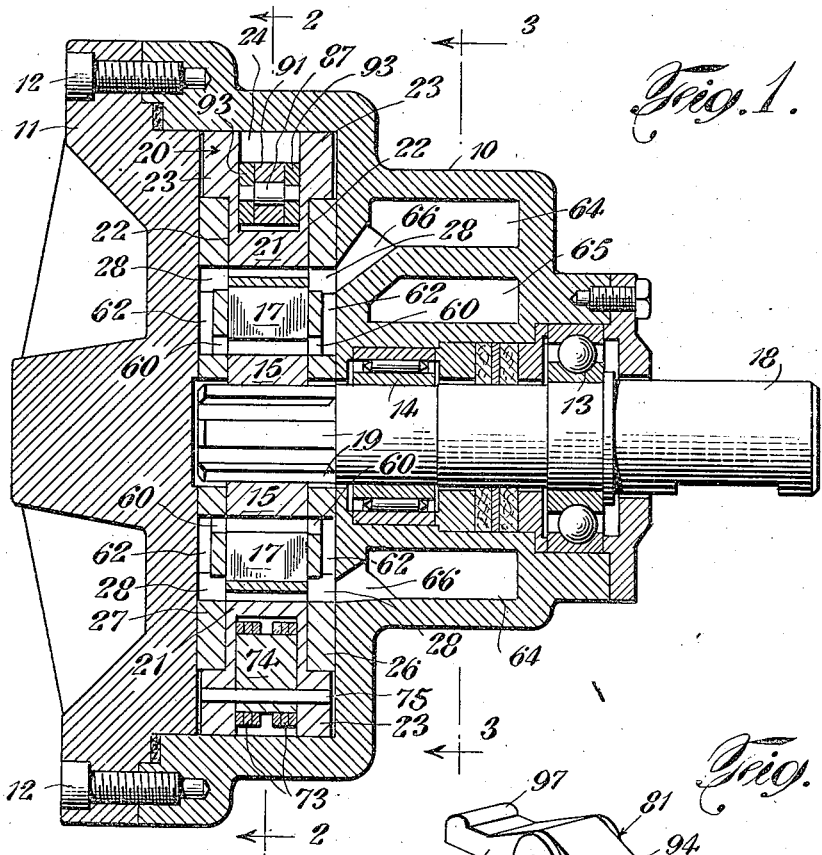
Fig. 1.
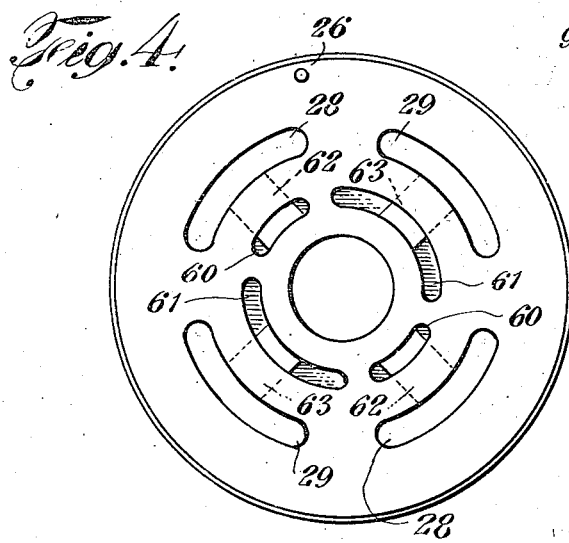
Fig. 4.
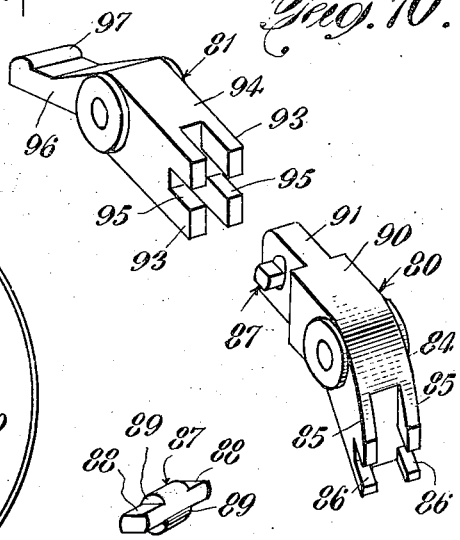
Fig. 10.
Fig. 11.
INVENTORS
CHARLES M. KENDRICK
IVAN A. KAZINE
BY Bartlett, Eyre, Keel & Weymouth
ATTORNEYS March 9, 1943.　　C. M. KENDRICK ET AL　　2,313,246
FLUID PRESSURE DEVICE
Filed May 31, 1941　　6 Sheets-Sheet 2
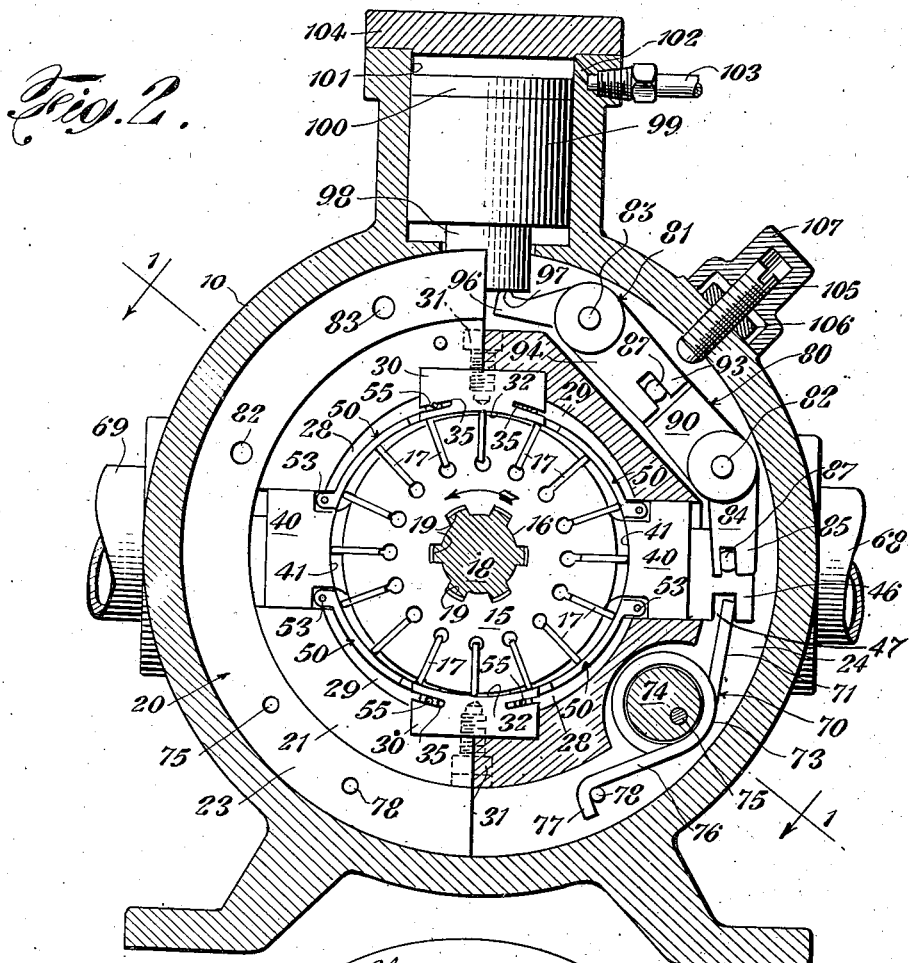
Fig. 2.
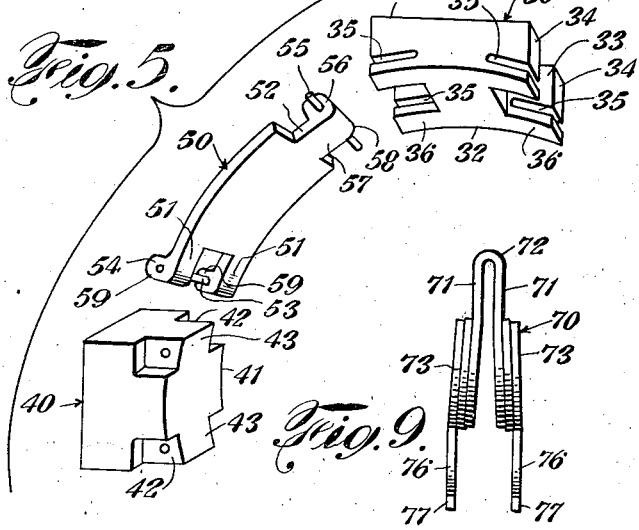
Fig. 5.
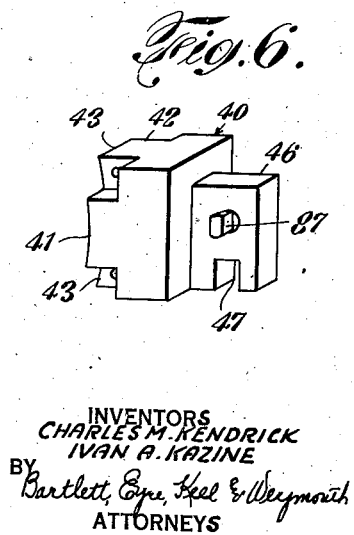
Fig. 6.
Fig. 9.
INVENTORS
CHARLES M. KENDRICK
IVAN A. KAZINE
BY Bartlett, Eyre, Keel & Weymouth
ATTORNEYS March 9, 1943.   C. M. KENDRICK ET AL   2,313,246
FLUID PRESSURE DEVICE
Filed May 31, 1941   6 Sheets-Sheet 3

INVENTORS
CHARLES M. KENDRICK
IVAN A. KAZINE
BY
Bartlett, Eyre, Keel & Weymouth
ATTORNEYS March 9, 1943.  C. M. KENDRICK ET AL  2,313,246
FLUID PRESSURE DEVICE
Filed May 31, 1941  6 Sheets-Sheet 4
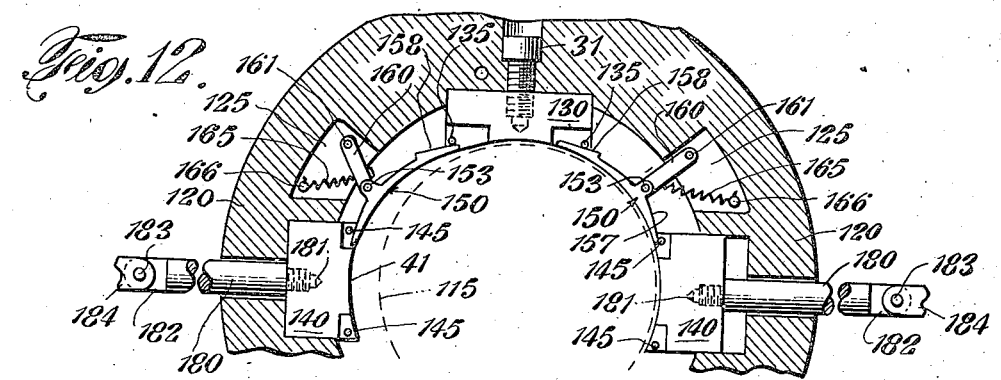
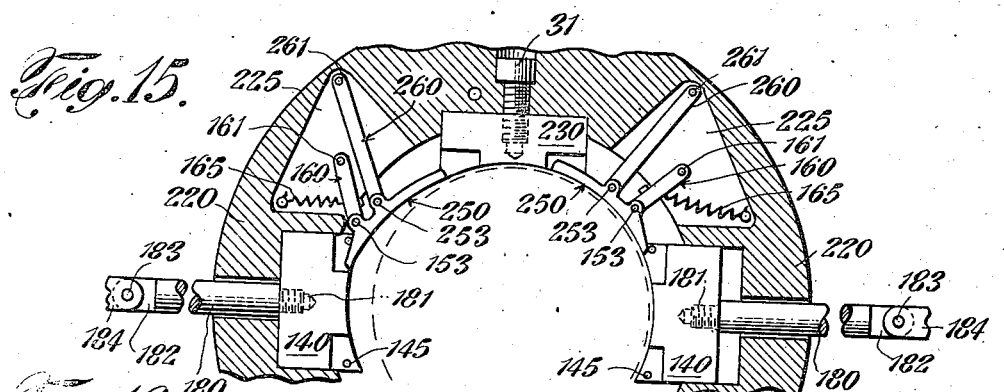
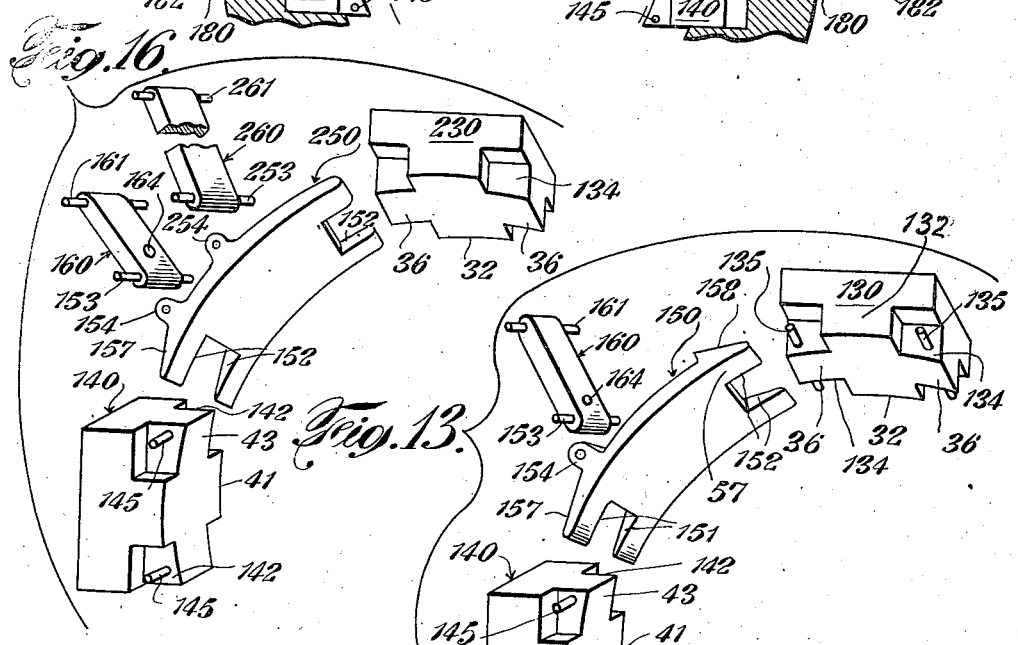
INVENTORS
CHARLES M. KENDRICK
IVAN A. KAZINE
BY
Bartlett, Eyre, Keel & Weymouth
ATTORNEYS

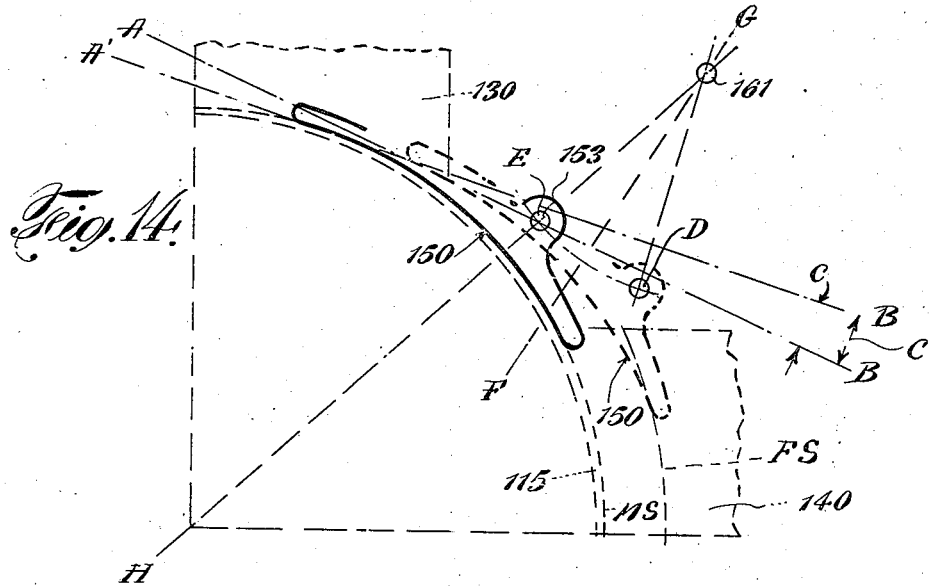
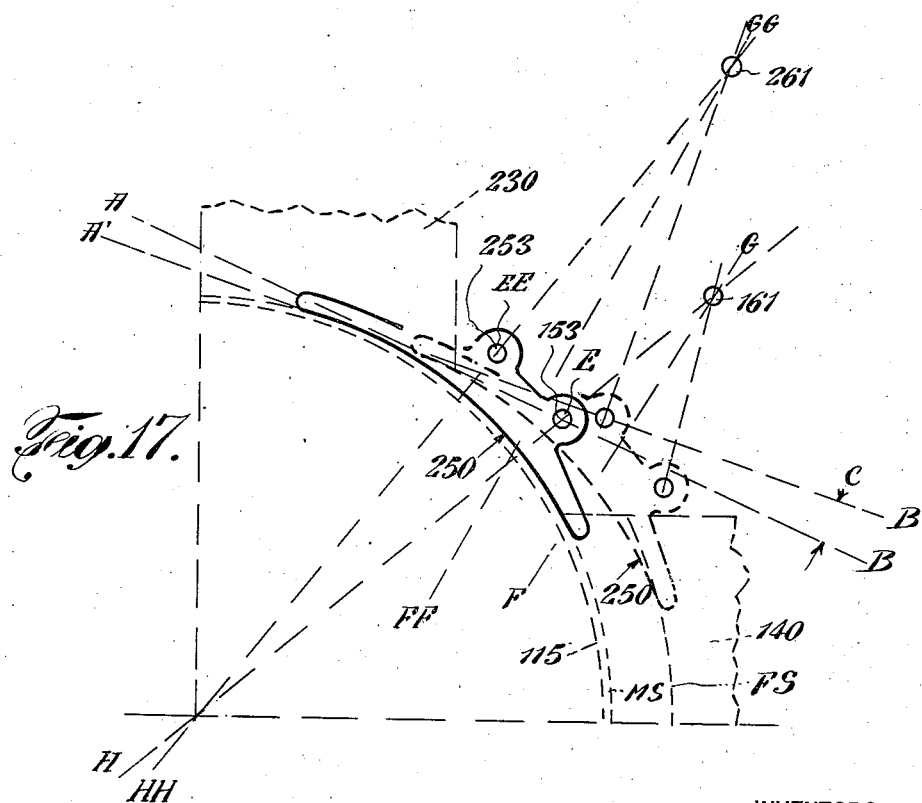

March 9, 1943. C. M. KENDRICK ET AL 2,313,246
FLUID PRESSURE DEVICE
Filed May 31, 1941 6 Sheets-Sheet 6
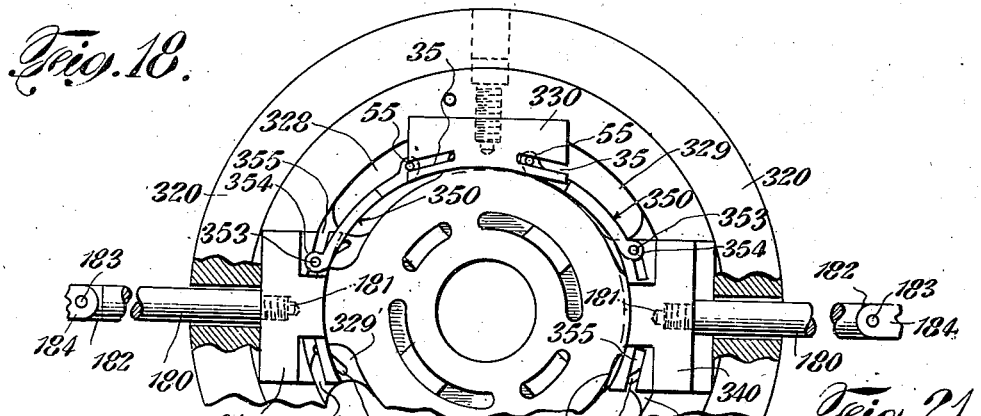
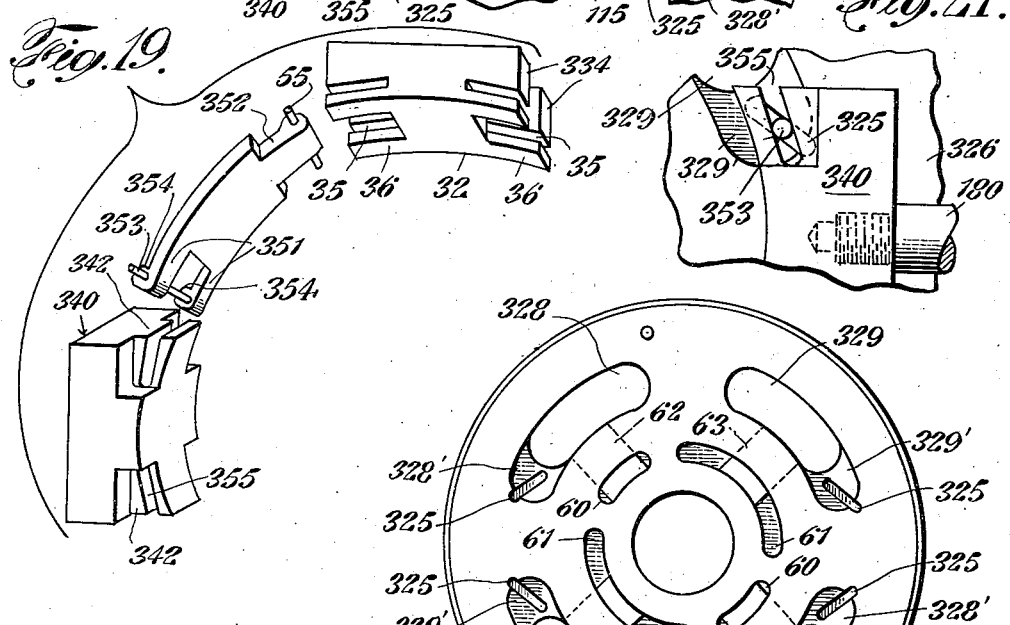
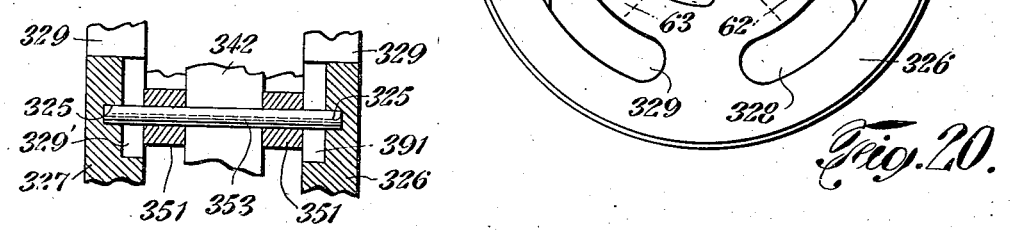
INVENTORS
CHARLES M. KENDRICK
IVAN A. KAZINE
BY
ATTORNEYS Patented Mar. 9, 1943

2,313,246

UNITED STATES PATENT OFFICE 2,313,246

FLUID PRESSURE DEVICE

Charles M. Kendrick and Ivan A. Kazine, New York, N. Y., assignors to Manly Corporation, Washington, D. C., a corporation of Delaware Application May 31, 1941, Serial No. 395,950

31 Claims. (Cl. 103—120)

This invention relates to vane type rotary fluid pressure devices such, for example, as pumps or fluid motors, the volumetric capacity or output per revolution of which can be regulated or varied, and it relates, more particularly, to improvements in that portion of the fluid pressure device by means of which such variation of capacity or output is obtained.

The widest present use for fluid pressure devices of this general class is as hydraulic devices, that is, devices for handling or whose motive fluid is a liquid, such, for example, as oil, and the fluid pressure device of the present invention will be described in connection with such use. It will be understood, however, that the invention is applicable to fluid pressure devices operating with elastic fluids.

Fluid pressure devices of the type under consideration include a rotor provided with vanes which are movable inwardly and outwardly in a general radial direction and arranged to rotate within a chamber having side walls which closely fit the sides of the rotor and the side edges of the vanes. A vane track, which surrounds the radially outer ends of the vanes and controls their inward and outward movement, comprises one or more pairs of abutments and interconnecting track elements. One abutment of each pair is preferably arranged in fixed position adjacent the circumferential surface of the rotor and the other abutment of each pair is adapted to be radially adjusted with respect to said circumferential rotor surface. With this preferred arrangement the work of the fluid pressure device is done while the vanes move across an arc on the working or movable abutment of each pair, termed the "working" or "pumping arc," which, when the device is at other than zero "stroke," is spaced radially from the circumferential surface of the rotor, forming a working or fluid transfer chamber. The circulated fluid is received on one circumferential end of this working chamber or pumping arc and discharged on the other.

The volumetric capacity or output per revolution of the fluid pressure device is regulated or varied by radially adjusting the working or movable abutment of each pair with respect to the surface of the rotor. The interconnecting track element or elements serve to guide and convey the outer ends of the vanes from one abutment to another in all positions of the movable abutment, permitting radial adjustment of the movable abutment without changing the radial position of the other abutment of each pair.

Our co-pending application Serial Number 263,649, filed March 23, 1939, relates to such a fluid pressure device and, while the construction therein disclosed has been found to be successful, the present invention concerns certain improvements which further facilitate manufacture and which increase the scope of usefulness of the device while retaining the advantages of our previous construction. The general object of the present invention, therefore, is to provide an improved variable-capacity vane type fluid pressure device of this character. Another and important object is to improve the construction and arrangement of the vane track and its associated mechanism by means of which the volumetric capacity per revolution of the rotor of the fluid pressure device is determined, and regulated and varied, and by which the inward and outward movements of the vanes are controlled.

The fluid pressure device of the present invention differs importantly from that disclosed in the above-mentioned co-pending application in several respects, one of which is the means and arrangement by which the interconnecting track elements (which are disposed intermediate the fixed and movable abutments and which in the embodiments illustrated are substantially rigid) are mounted and by which their movement and position are controlled relative to the track surfaces on the adjacent fixed and movable abutments. For example, in the arrangement of our co-pending application each interconnecting track element is pivotally mounted on its corresponding fixed abutment or other suitable stationary part of the track or casing assembly, whereas in the arrangement of the present invention the end of each interconnecting track element adjacent the fixed abutment has an extensible connection with said fixed abutment, the advantages of which will be hereinafter pointed out. The present invention further provides an arrangement in which the interconnecting track elements have extensible connections with both the adjacent fixed and movable abutments, whereas our former construction provided an extensible connection with the abutment at only one end of the interconnecting track member, that is to say, at the end thereof adjacent the movable abutment.

The arrangement of the present invention still further provides simple, novel and improved means, housed within the enclosing casing, for conjointly moving the movable abutments of the vane track assembly in order to alter the capacity of the fluid pressure device per revolution of its rotor.

The invention will be understood from consideration of the accompanying drawings which illustrate, by way of example, a number of embodiments of the invention in a pump having two working or pumping chambers, that is to say, in a so-called "double" or "double-acting" pump. It will be understood, however, that the invention is also applicable to other fluid pressure devices such, for example, as fluid motors and that the fluid pressure device can be made a "single" or "single acting" device having only one working chamber and also that more than two working chambers may be employed if desired.

In the accompanying drawings:

Fig. 1 is a longitudinal sectional view taken along the lines 1—1 of Figs. 2 and 3;

Fig. 2 is a vertical view transverse the axis of rotation of the rotor, partially in section, along the line 2—2 of Fig. 1 but with certain of the elements wholly or partially shown in end elevation;

Fig. 4 shows an elevation of the inner or rotor face of one of the members, for convenience termed the "casing cheek plate";

Fig. 5 is an enlarged perspective view of the elements comprising the improved vane track illustrated in Figs. 1 and 2, with these elements separated from but showing their relation to one another;

Fig. 6 is a perspective view of one of the elements shown in Fig. 5, for convenience termed a "movable abutment," drawn to substantially the same scale as that of Fig. 5 but viewed from a different angle;

Fig. 9 is a perspective view of the double torsion type spring shown in Figs. 1 and 2;

Fig. 10 is an enlarged perspective view of two of the elements comprising the improved adjusting and control means illustrated in Fig. 2, with the elements separated from but showing their relation to one another;

Fig. 11 is an enlarged perspective view of another of the elements comprising the improved adjusting and control means;

Fig. 12 illustrates a modification which is shown partly in section and partly in schematic arrangement;

Fig. 13 is an enlarged perspective view of the elements comprising the modified vane track illustrated in Fig. 12, with the elements thereof separated from but showing their relation to one another;

Fig. 14 is a diagrammatic view showing certain features of construction and arrangement of the modified vane track elements illustrated in Figs. 12 and 13;

Figs. 15, 16 and 17 are views corresponding generally to Figs. 12, 13 and 14 respectively but showing another modification;

Figs. 18 and 19 are views corresponding generally to Figs. 12 and 13 but showing a further modification;

Figure 3:
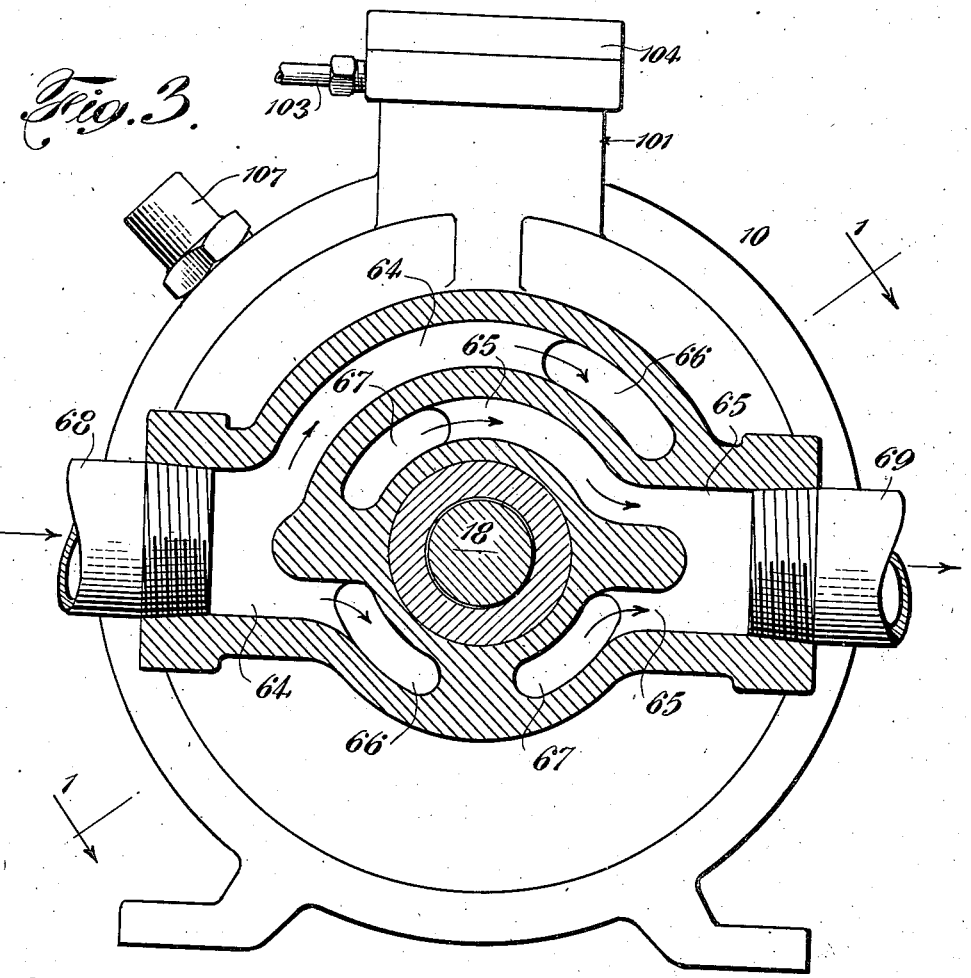
Fig. 3 is also a transverse sectional view but is taken along the line 3—3 of Fig. 1 looking in a direction opposite to that of Fig. 2 as indicated by the arrows.

Fig. 20 shows an elevation of the inner or rotor face of a modified member, for convenience termed the "casing cheek plate," which is employed with the modified vane track elements illustrated in Figs. 18 and 19; and Figs. 21 and 22 are enlarged fragmentary views showing certain details and features of construction of the modified arrangement illustrated in Figs. 18 and 19.

Referring first to the embodiment illustrated in Figs. 1 to 11 inclusive of these drawings, the pump includes a casing 10 and an end head or cover 11 which co-operate to form a cavity for the rotor 15 and associated parts as shown in Figs. 1 and 2. The rotor 15 is provided with a plurality of substantially radial vane slots in each of which is a vane 17 arranged for movement inward and outward thereof in a substantially radial direction.

The rotor 15 and shaft 18 may be mounted and the two parts operatively connected with each other in any appropriate way. In the present instance the rotor 15, shaft 18, their mountings and the operative connections therebetween are the same as disclosed in co-pending application filed December 8, 1939, Serial Number 307,755. As shown in Fig. 1, the shaft 18 is revolubly supported by a pair of bearing elements 13 and 14 carried by the casing 10 and the rotor 15 is mounted on the end of the shaft 18 which projects into the rotor cavity. For this purpose the end of the shaft 18 is formed with axially extending splines 19 (Figs. 1 and 2) and the rotor 15 is formed in its central opening with mating splines 16 (Fig. 2). The arrangement is such that the rotor 15 is freely movable in an axial direction on the shaft splines 19 while permitting a limited tilting or rocking motion of the rotor 15 relative to the shaft 18 in such manner that the cheek plates 26 and 27 to be presently described, determine the axial and angular positions of the rotor on the shaft and the plane of rotation of the rotor as fully explained in co-pending application Serial Number 307,755 above mentioned.

A substantially annular spacer ring, broadly designated by the numeral 20, surrounds the rotor and vane assembly. The spacer ring 20 is recessed on both its faces and adjacent its central opening to form an inner web portion 21 (Fig. 1) which separates a pair of disk-shaped end plates or cheek plates 26 and 27 respectively having holes at their centers for the shaft 18 and whose inner opposing faces form fluid tight fits with the faces 22 of the web portion 21. The web portion 21 thus separates and axially positions the cheek plates 26 and 27 with respect to the rotor 15 and the arrangement is such that the rotor is permitted to turn freely while its sides and the side edges of the vanes 17 form substantially fluid-tight running fits with the adjacent faces of the cheek plates 26 and 27. The outer faces of the cheek plates 26 and 27 are adapted to fit snugly against the wall surfaces of the casing 10 and end head 11 respectively and to form substantially fluid-tight joints with the ports and passages in the casing 10. In order that the cheek plates 26 and 27 may assuredly provide the above-mentioned fluid-tight fits with the wall surfaces of the casing 10 and of the end head 11 and with the faces 22 of the web portion 21, the arrangement is preferably made such that the combined thicknesses or axial dimensions of the two cheek plates 26 and 27 and the web portion 21 exceed the thickness or axial dimension of the outer flange portion 23 of the spacer ring 20 as illustrated in Fig. 1. With this preferred arrangement there is a space between the wall surfaces of the casing 10 and end head 11 respectively and the faces of the outer flange portion 23 and the substantially fluid-tight fits between the parts above-mentioned may be readily obtained by tightening the cap screws 12 (Fig. 1) which fasten the end head 11 to the casing 10. The cheek plate 26 will hereinafter be referred to as the "casing cheek plate" and the cheek plate 27 will be referred to as the "end head cheek plate."

The space within the chamber formed by the cheek plates 26 and 27 and which surrounds the rotor 15 is divided into a plurality of fluid sections, preferably two, each consisting of a working or pumping chamber flanked by an inlet area and an outlet area. In the embodiment illustrated in Figs. 1–11 inclusive, this space surrounding the rotor is divided into two fluid sections by a pair of diametrically positioned fixed abutments 30 (Fig. 2) which extend inward from the spacer ring 20 and are positioned above and below the rotor 15 adjacent the vertical centerline thereof. Each fixed abutment 30 is received within an appropriate recess formed in the spacer ring 20 and is held in place by a screw 31, the arrangement being such that each fixed abutment 30 forms a substantially fluid-tight seal with the bottom of its corresponding recess. Each fixed abutment 30 is of the same thickness as that of the web 21 of the spacer ring 20 and thus forms a substantially fluid-tight seal with the faces of the cheek plates 26 and 27. The interior surface of each fixed abutment 30 includes an arcuate track surface 32 (Figs. 2 and 5), termed a "sealing arc," preferably concentric with the rotor 15 but not necessarily so, which is adapted to form a substantially fluid-tight sliding fit with the ends of the vanes 17 and which has an angular length equal to or slightly greater than the distance between a pair of adjacent vanes 17; the sealing arcs 32 are preferably spaced from the rotor 15 so as to provide a small clearance between said sealing arcs 32 and the periphery of the rotor 15, the purpose of which will be hereinafter explained. The fixed abutments 30 thus co-operate with the rotor 15 and vanes 17 to form the divisions between the pump's two fluid sections.

The working or pumping chambers of the two fluid sections are formed by means of two diametrically positioned movable abutments 40, acting in conjunction with the rotor and vanes. The abutments 40 are shown in side elevation in Fig. 2 and one is shown in perspective in Figs. 5 and 6. The working or pumping chambers are formed by means of the two diametrically positioned working or pumping arcs 41, one of which is formed on the inner end or surface of each of the movable abutments 40 with the center line of each arc 41 preferably in line with the horizontal center line of the corresponding abutment 40. Each working or pumping chamber extends in a circumferential direction for a distance equal to the space between two adjacent vanes 17 which at any given instant are moving in contact with the corresponding working or pumping arc 41. The arcs 41 will hereinafter be referred to as the "pumping arcs." The size of the pumping chambers, and hence the volume of fluid delivered per revolution of the rotor 15, is determined by the distance of the pumping arcs 41 from the circumferential surface of the rotor 15.

The movable abutments 40 are arranged to be adjusted in a substantially radial direction to permit regulation or variation in the size of the pumping chambers and hence in the output of the pump. The movable abutments 40 are accordingly supported by and form substantially fluid-tight fits with a pair of parallel slideways formed in the spacer ring 20 as shown in Fig. 2; the present invention provides simple and improved means (to be later described) by which such movement of the two movable abutments 40 may be conjointly effected, but it will be understood that any other suitable means may be employed for this purpose.

An important feature of the present invention is the construction and arrangement of the vane track by means of which the outer ends of the vanes are guided in their in-and-out movement as the rotor revolves. This vane track comprises the inner or vane-contacting surfaces of the fixed abutments 30, the movable abutments 40 and of interconnecting track elements which extend in a generally circumferential direction between these abutments to guide the vanes as they move from one abutment to another as the rotor revolves. In the present embodiment the interconnecting track elements take the form of substantially rigid (that is to say, not readily bendable) links 50 as shown in Figs. 2 and 5, and these members will hereinafter be termed the "links," "track links," etc. Two of these track links 50 are employed in each of the two fluid sections of the pump of the present embodiment and serve to connect the movable abutment 40 thereof with the two fixed abutments 30 as shown in Fig. 2 and all four of the links 50 are preferably identical with one another.

The end of each link 50 is forked adjacent its corresponding movable abutment 40, as indicated at 51 in Fig. 5, in order to receive the reduced end portion 42 of the movable abutment. The end of each link 50 adjacent its corresponding fixed abutment 30 is reduced in width to form a tongue 52 (Figs. 5, 7 and 8) which extends into a slot 33 on the adjacent end of said fixed abutment 30, the slot 33 on each end of each fixed abutment 30 thus providing a pair of arms 34 one of which is disposed on each side of the tongue 52. The side faces of the forked end 51 and of the tongue 52 of the link 50 may have sliding fits with the movable abutment's reduced end portion 42) and with the side faces of the arms 34 respectively but a small clearance between these parts is usually preferable for convenience in manufacture and assembly and in order to prevent binding as the parts of the vane track are moved relative to each other when the output of the pump is altered. The reduced end portion 42 of the movable abutment 40 extends into the forked end 51 of the link 50 and the tongue 52 extends into the slot 33 in such manner that the vane-contacting surfaces on the link overlap the vane-contacting surfaces of the abutments in all positions of adjustment of the vane track, as will be understood from Figs. 2, 5, 7 and 8.

Each link is provided with at least one pivotal mounting which contributes toward its positioning with respect to the track surfaces on the fixed and movable abutments and co-ordinates its movement with that of the corresponding movable abutment. In the embodiment illustrated in Figs. 1, 2 and 5, each link 50 is pivotally supported upon its corresponding movable abutment 40 (Figs. 2 and 5), this pivotal support or mounting comprising a pin 53 which extends through suitable holes in the short arms 54 on the forked end 51 of the link and through a hole in the reduced end portion 42 of the movable abutment 40; for convenience in illustration, in Fig. 5 the pin 53 has been shown in position in the holes in said arms 54. The tongue 52 of each link 50 is supported and positioned by a pin 55 which extends through a suitable hole in the short arm 56 adjacent the end of the tongue 52 and also extends into a slot 35 formed in each arm 34 of the fixed abutments 30, as shown in Figs. 2, 5, 7 and 8.

With this arrangement, each link 50 is moved conformably with the extent and direction of the adjusting movement of its corresponding movable abutment 40 by means of the pivotal connection between them provided by the pin 53, this movement taking place as said movable abutment 40 is moved inward or outward to alter the output of the pump. As the link 50 moves in unison with the movable abutment 40, the pin 55 moves in the slots 35 and the tongue 52 is thus guided and its position controlled relative to the track surfaces 36 on the arms 34 of the fixed abutment 30. A sliding, extensible connection is thus provided between the fixed abutment 30 and the tongue 52 of the link 50 and the only rocking or tilting of the link 50 about its pivotal mounting on the movable abutment 40 is the amount produced by change in the vertical distance between the pin 55 and the horizontal center line of the pump, this change in vertical distance being determined by the contour of the slots 35. Rocking or tilting of the link 50 about the pin 53 and relative to the movable abutment 40 results in a slight rocking or tilting of said link relative to the fixed abutment 30 which is readily permitted by the pin 55. It will be observed, however, that two motions or components of motion are imparted to the link 50 as its corresponding movable abutment 40 is adjusted inward or outward, one of these motions or components of motion being that imparted to the link by the lateral or substantially radial movement of the movable abutment 40 and the other being the rocking or tilting of the link.

This arrangement is in contrast with our previous construction in which the link is pivotally mounted on the fixed abutment and has an extensible connection with the movable abutment and has several important advantages. For example, with the present arrangement the direction or path of movement of the link at its sliding or extensible connection more closely approaches a parallel relation to the direction or path of movement of the movable abutment, so that for any given inward or outward movement of the movable abutment there is considerably less change in the position of the link 50 of the present arrangement relative to the fixed abutment 30 and relative to the movable abutment 40 than in the arrangement of our previous construction, and this is particularly true with respect to the change in angular relation of the link relative to the track surface on the fixed abutment. The small change in position of the link 50 relative to the abutments, and especially the small change in angular position relative to the track surface on the fixed abutment 30, in turn provides the related advantage of improved contour of the vane track, that is to say, of the vane-contacting surfaces of the vane track, particularly at the more critical regions adjacent the fixed abutments where the radial velocity of the vanes is relatively low. For example, with the present arrangement the contour of the vane track surfaces may be made such that under the influence of centrifugal force alone the vanes move outward and remain in contact with the track surfaces as said vanes pass through the inlet areas of the pump. This track following action of the vanes under the influence of centrifugal force alone may be obtained with the present arrangement at the maximum strokes usually employed with pumps of this character and at strokes considerably greater than those at which such contact between the vanes and vane track surfaces can be maintained by centrifugal force alone with our previous construction. With the present improved arrangement it is thus unnecessary to employ fluid pressure means to urge the vanes outward as they pass through the inlet areas and hence it is possible to substantially balance hydraulic forces acting on the inner and outer ends of the vanes as they traverse the track surfaces on the links and at the points of transfer between the links and the abutments and vice versa. The improved contour of the vane track surfaces and the balance of hydraulic forces acting radially on the vanes made possible by the improved contour contribute numerous advantages such, for example, as smoother and less abrupt radial movement of the vanes, decrease in the friction and wear between the vanes and vane track, increase in the output of the pump per revolution of its rotor because of the fluid which is then pumped by the inner ends of the vanes and increase in the pump's efficiency.

It is essential that the vane-contacting surfaces of the links 50 be maintained in vane-transferring relation to the surfaces of the abutments which they connect in order that the vanes may pass smoothly from one of these members to another. It is also necessary that this relation between the track surfaces of the links and abutments be provided at all outputs of the pump, that is to say, at all positions of the movable abutments 40 from their zero or fully inward position to their maximum stroke or fully outward position. The importance of this will be understood from the fact that the rotor is frequently driven at a speed of 1200 R. P. M. or more and that each vane 17 passes to and from each of the track elements during each revolution of the rotor. It is also essential that the contour of the vane track be such at all outputs of the pump that the vanes are moved outward and kept in contact with the vane-contacting surfaces of the track by the available centrifugal force alone in the preferred arrangement in which the pressures of the fluid at the inner and outer ends of the vanes are substantially balanced during the time that the outer ends thereof are moving outward through the inlet areas. These requirements are met by providing proper contours of the vane-contacting or track surfaces of the track elements and by arrangement of the pivotal connections between the links 50 and movable abutments 40 and slidable connections between the links 50 and fixed abutments 30 to provide vane-transferring relation between the track elements at the overlapping joints therebetween at all outputs of the pump. There is thus considerable latitude in the contours of the track surface of the track elements and in the arrangement of the pivotal and sliding or extensible connections between the track elements which may be employed but for purposes of further and more definite explanation an arrangement that has proved satisfactory and that is at present regarded as preferred will now be described.

Referring to Fig. 5, the entire vane-contacting surface on each movable abutment 40, including both its working or pumping arc 41 and the portions of the vane-contacting surface 43 on its reduced end portions 42, is made of arcuate contour concentric with the rotor when said movable abutment 40 is in its half-stroke position, i. e. when said abutment is midway between its extreme inward and outward positions of adjustment. The portions 36 of the track surface extending from the circumferential ends of the sealing arc 32 of each fixed abutment 30 (Figs. 5, 7 and 8) are given a curvature of slightly but gradually increasing radius so that the vanes 17 begin to move radially outward immediately upon leaving the sealing arc 32 and vice versa, but the increase in radius of this portion of the track surface does not exceed the radially outward distance through which the vanes 17 can be moved by centrifugal force alone as they traverse this part of the track surface. In practice each portion 36 of the track surface may be acceptably formed with what for convenience is termed a "full stroke cam surface," that is to say, its contour may be made the same as that of the corresponding part of a cam for the outer ends of the vanes which would provide constant radial acceleration and deceleration of the vanes as they move intermediate the fixed and movable abutments, with the movable abutment in its full stroke position. The track surface on each link 50, however, is preferably formed with a "half stroke cam surface," that is to say, the track surface on each link 50 preferably approximates a portion of a parabola and is made such as to provide substantially constant radial acceleration and deceleration of the vanes as they pass thereacross when the movable abutment 40 is in its half-stroke position. The contour of the character just described extends throughout the length of each link 50 except immediately adjacent the ends of said link as will be more fully explained presently.

The slots 35, which serve as guideways for the pins 55, are so disposed and their configuration made such that all or part of the track surface on the tongue 52 of each link that overlaps the track surface on the corresponding fixed abutment 30, at the extensible connection therebetween, is maintained in vane-transferring relation with the overlapped part of the track surface portion 36. This vane-transferring relation is provided throughout all positions to which said link 50 is moved incident to inward and outward adjustment of the corresponding movable abutment 40 and assures movement of the vanes from one of these track elements to the other which provides smooth, quiet and satisfactory operation of the pump without materially increased wear of the vanes or track parts at the jointed connection between said parts. In order that this relation may be provided between the track surfaces of the link 50 and the fixed abutment 30 at the extensible connection between them, the slots 35 for each pin 55 may be said to be positioned along the line generated by movement of the pin 55 when the vane-contacting surface on the tongue 52 is kept in vane-transferring relation with the corresponding portion 36 of the track surface on the arms 34 and the corresponding movable abutment 40 is adjusted from full stroke to zero stroke, i. e. from its extreme outward position to its extreme inward position. A line so generated has a slight curvature theoretically but this curvature is so small that in practice it often may be neglected and the slots 35 may be substantially straight as in the embodiment illustrated in Figs. 1–11.

Figures 7, 8:
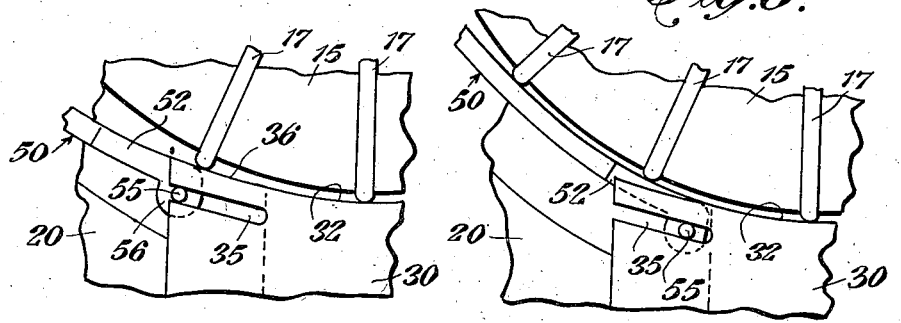
Fig. 7 is an enlarged fragmentary view, somewhat exaggerated, showing the position of the end of a link member illustrated in Figs. 1, 2 and 5 relative to its corresponding fixed abutment when the movable abutment thereof is adjusted to its "full stroke" or maximum outward position.
Fig. 8 is a view generally similar to Fig. 7 showing the relative positions of the parts when the movable abutment is adjusted to its minimum stroke or extreme inward position.

When straight slots 35 are employed, vane-transferring relation between the overlapping track surfaces of the links 50 and fixed abutments 30 at all strokes of the pump may be assured by making the arrangement such that substantially perfect alinement and transfer are provided between the overlapping track surfaces of these parts when the link 50 is in its position corresponding to the maximum stroke position of its movable abutment 40, as illustrated in Fig. 7. It is also preferable that the track surface 57 (Fig. 5) adjacent the tip end of the tongue 52 be slightly "straightened," i. e. that the curvature thereof be made less than that of the corresponding portion of the "half stroke cam surface," the extreme tip end 58 (Fig. 5) of each tongue 52 is preferably rounded off as shown in order to assure that there will be no obstruction to the smooth and uninterrupted movement of the vanes in contact with the track surfaces as they move across the extensible connection between each link and its adjacent fixed abutment 30. With this arrangement there is a slight intersecting or angular relation between the track surface on the tongue 52 and on the arms 34 at the extensible connection between them as the link is moved to positions corresponding to positions of the movable abutment 40 inward from its full stroke position, that is to say, this slight intersecting relation exists theoretically at all strokes except full stroke. This very slight intersecting relation progressively increases, theoretically, as the stroke is decreased and reaches its maximum at zero stroke of the pump, as shown in Fig. 8 from which the very slight amount of the angular relation between the track surfaces on the link 50 and fixed abutment 30 at the point of vane-transfer between them may be observed. The very small amount of angularity between the track surfaces of the links 50 and fixed abutments 30, at the points of vane-transfer of the extensible connections therebetween, with the arrangement above described does not interfere with vane transfer and smooth vane action, and satisfactory operation has been obtained at all outputs of a pump employing an arrangement of this general character.

Vane transferring relation at the overlapping connections between the links 50 and movable abutments 40 may be readily provided by so positioning the holes in the arms 54 of said links and in the abutment's reduced end portions 42 that, when the parts are connected by means of the pins 53, the track surface on the forked end 51 of each link merges smoothly with the track surface 43 on the reduced end portion 42 of the corresponding movable abutment 40 when said movable abutment 40 is in its half-stroke position. In fact, the track surface on the forked end of each link 50 may be made to merge so smoothly with the portion 43 of the track surface on the movable abutment 40 that there will appear to be substantial alinement between them for an appreciable circumferential distance when the abutment is in its half-stroke position. Upon movement of a movable abutment 40 outward from its half-stroke position the amount or circumferential length of the portions of the overlapping track surfaces in alinement with one another progressively decreases and vane transfer from one track element to another takes place increasingly nearer the working or pumping arc 41. Similarly, the point of vane transfer moves away from the working arc 41 upon movement of the abutment 40 inward from its half-stroke position.

As already stated, there is a slight rocking motion or component of motion of each link 50 about its pin 53 at the movable abutment 40 as said abutment is moved inward or outward to alter the stroke of the pump but this rocking motion is so small that it presents no difficulty in providing vane-transferring relation at this overlapping connection between each link and its corresponding movable abutment at all outputs of the pump. For example, in a pump having a vane track of the general character described and arranged to provide a maximum stroke of the vanes of about ¼", the pump also having a rotor of approximately 3¼" diameter, it has been found by calculation that the rocking of each link 50 about its pin 53 on either side of the half stroke position of the movable abutment and link is approximately 1° to 2° and is so small that it is not readily apparent. The portions of the track surface adjacent the forked ends 51 of the links 50 are preferably relieved and rounded off, however, as indicated at 59 in Fig. 5, and the end portions 43 of the track surface on the movable abutments may also be relieved in order to assure at all times smooth and uninterrupted movement of the vanes from one of these track elements to another and in order to compensate for any small errors in manufacture. It is also preferable that the links 50 have little or no vane contacting surface which extends beyond the centers of the pins 53 toward the pumping arcs 41. It is further usually preferable that the links 50 be arranged to extend as close as possible toward the pumping arcs 41, thus making it possible to keep to a minimum the vertical dimension of the movable abutments 40 which is frequently desirable.

Due in part to the fact that the links 50 are rigid and are provided with track surfaces of non-uniform (i. e. non-circular) curvature, the vane track hereinbefore described does not assume true circular outline when the movable abutments 40 are moved inward to their zero stroke position, at which the pumping arcs 41 are spaced from the periphery of the rotor 15 by a clearance equal to the clearance at the sealing arcs 32. With the track elements adjusted to their zero stroke position, therefore, the diameter of the vane track at the sealing arcs 32 is not its smallest diameter, as may be observed in Fig. 8 in which the portion of the link 50 just beyond the tongue 52 is separated from the peripheral surface of the rotor by a clearance less than that between said rotor and the sealing arc 32. The diameter of the rotor 15 is thus determined by the minimum diameter of the vane track at this region of the links 50 when the parts are in zero stroke position, and the clearance between the rotor 15 and sealing arcs 32 must be correspondingly greater than would otherwise be required. The operation of the pump is not adversely affected by this increased clearance or by the slight radial movement of the vanes occasioned by inward protrusion of the track surface on the links 50 since the hydraulic forces acting on the leading and trailing faces of the vanes are substantially balanced during this part of the vanes' movement in unison with the rotor.

Fluid is admitted to the spaces between the outer ends of the vanes 17 as they approach each pumping or working arc 41 and fluid is discharged in like manner as the vanes recede therefrom. This admission and discharge is accomplished through a pair of diametrically opposite inlet ports 28 and a similar pair of outlet ports 29 formed in each of the cheek plates 26 and 27, as best shown in Fig. 4 which shows an elevation of the rotor face of the casing cheek plate 26. The inlet ports 28 of both cheek plates 26 and 27 are also shown in the sectional view of Fig. 1 and the inlet ports 28 and outlet ports 29 of the casing cheek plate 26 are partially shown in Fig. 2. Each of the cheek plates 26 and 27 is also provided, on its face adjacent the rotor 15, with two pairs of arcuate vane slot ports 60 and 61, respectively, which are positioned to register successively with the inner ends of the vane slots as the rotor revolves. The vane slot ports 60 are connected with the inlet ports 28 by radial grooves or passages 62 on the outer faces of the cheek plates 26 and 27 and similarly the vane slot ports 61 are connected with the outlet ports 29 by the passages or grooves 63, as will be understood from Fig. 4. The vane slot ports 60 and radial grooves 62 of both cheek plates 26 and 27 are also shown in the sectional view of Fig. 1. The arrangement is such that the inner ends of the vane slots are connected with fluid under the same pressure as the fluid acting upon the outer ends of their corresponding vanes 17 while said vanes are moving intermediate the fixed abutments 30 and movable abutments 40, and vice versa, and hence the hydraulic forces acting on said vanes 17 are substantially balanced during this part of their rotational movement in unison with the rotor. The vane slot ports 61 are conveniently made of such length that they also connect with those vane slots whose vanes 17 are moving in contact with the working arcs 41 and sealing arcs 32, so that pressure fluid from the outlet ports 29 is supplied to the inner ends of such vanes to assist in holding their ends firmly in contact with these portions of the vane track surface as they move thereacross.

The fluid circuit further includes a branched inlet conduit 64 and a branched outlet conduit 65 formed in the casing 10 as shown in Figs. 1 and 3. The inlet conduit 64 is connected by slanted passages 66 with inlet ports 28 of the casing cheek plate 26 (Figs. 1 and 3) and the outlet conduit 65 is connected with the two outlet ports 29 of said casing cheek plate 26 as by slanted passages 67 (Fig. 3) similar to the slanted passages 66. Fluid is supplied to the pump, as from a suitable reservoir, not shown, through an inlet pipe 68 and fluid is discharged by the pump into the outlet pipe 69 which may be connected with any suitable hydraulic device that is to be operated thereby.

When the rotor 15 is driven in a counter-clockwise direction as viewed in Fig. 2 fluid enters through the inlet ports 28 of the casing cheek plate 26 and passes into the connected inlet areas of the two pumping sections of the pump. Pumping is accomplished by the vanes 17 as they move across the working or pumping arcs 41 and the vanes 17 thus force fluid into the outlet areas of the two pumping sections from which it passes out through the outlet ports 29 of the casing cheek plate 26 and into the outlet conduit 65. As already explained, the size of the pumping chambers and the volume of fluid delivered by the pump per revolution of the rotor 15 are determined by the distance of the pumping arcs 41 from the periphery of the rotor 15; as this distance may be varied by infinitely small increments from minimum to maximum, the size of the pumping chambers and hence the volume of fluid delivered by the pump may be likewise varied from minimum to maximum or vice versa by adjustment of the movable abutments 40. The novel and improved means provided for adjusting the abutments to alter the delivery or stroke of the pump will now be described.

Referring to Fig. 2, fluid under te same pressure as that in the outlet ports 29 acts upon the connected portion of the radially inner end of each movable abutment 40 and exerts thereon a force tending to move said abutments radially outward as far as permitted by other parts of the adjusting and control means. Each abutment 40 is also urged radially outward by a double torsion type spring 70 (preferably made of spring wire of rectangular cross section, as shown) which is capable of moving said abutment radially outward when little or no pressure exists in the discharge ports 29 of the pump. Each of the two springs 70 is positioned in a portion of the recess 24 (Figs. 1 and 2) formed in the outer circumference of the spacer ring 20. The width or axial dimension of the recess 24 is less than that of the web portion 21 of the spacer ring 20, as shown in Fig. 1, and as shown in Fig. 2 said recess 24 has a non-uniform radial depth relative to the outer circumference of the spacer ring 20 in order to provide the space necessary to accommodate the several elements of the adjusting and control means which are positioned in said recess at different points around said recess' circumference.

Each of the two double torsion type springs 70 includes a central double arm portion 71 (Fig. 9) with a hair-pin end 72 which enters and slidingly engages a notch or slot 47 (Figs. 2 and 6) in a reduced outer portion 46 of the corresponding movable abutment 40, said reduced outer portion 46 having a substantially rectangular cross-section as best shown in the perspective view of Fig. 6. The coiled portions 73 of each spring 70 are mounted upon a center piece 74 (Figs. 1 and 2) which in turn is supported by a pin 75 carried by the side walls of the flange portion 23 of the spacer ring 20. Each spring 70 also includes a pair of arms 76 (Figs. 2 and 9) extending from the coiled portions 73 and having hooked ends 77 which engage a pin 78 that is also carried by the side walls of the flange portion 23 of the spacer ring 20. With this arrangement each spring 70 is supported by the spacer ring 20 and all parts thereof are disposed within the outer diameter of said spacer ring 20.

Each movable abutment 40 is moved inward by means of a pair of co-operating levers or bell cranks 80 and 81 respectively which also limit and control the maximum outward position to which said abutment 40 is permitted to be moved by its spring 70 and the internal fluid pressure in the pump. The bell cranks 80 and 81 are positioned in the recess 24 of the spacer ring 20 and are pivotally supported intermediate their ends by pins 82 and 83 respectively which are carried by the side walls of the flange portion 23 of the spacer ring, the arrangement being such that all parts of said bell cranks are disposed within the outer diameter of the spacer ring 20 at all positions to which said bell cranks are moved incident to adjustment of the corresponding movable abutment 40 from its full stroke position to its minimum or zero stroke position. The partial sectional view of Fig. 2 shows the bell cranks 80 and 81 for only one of the movable abutments 40 but it will be understood that a similar pair of bell cranks (the pivotal mountings 82 and 83 for which are shown) are provided for the other movable abutment 40, the arrangement for both abutments being identical.

As best shown in Fig. 10, the end of the arm 84 of the bell crank 80 is forked as at 85 to receive the reduced outer portion 46 of its movable abutment 40, one leg of the forked end 85 extending on either side of said reduced outer portion 46 as will be understood from Fig. 2. The forked end 85 of the bell crank 80 is operatively connected with the corresponding movable abutment 40 by means of a pin 87 (Figs. 6 and 11) which is mounted in a hole drilled horizontally through the reduced outer portion 46 of the abutment, as will be understood from Fig. 6 which shows the pin 87 in place in said hole. The pin 87 is provided with flattened end portions 88 (Figs. 2, 6 and 11) which slidingly fit in slots 86 formed in the forked end 85 of the bell crank 80. With this arrangement the bell crank 80 is free to move angularly with respect to its abutment 40 as said bell crank swings on its pivot 82, the pin 87 turning in its hole to provide sliding area contact between the flattened end 88 and the side walls of the slots 86. It will also be observed that the shoulders 89 (Fig. 11) formed by the juncture of the flattened end parts 88 and the central round portion of the pin 87, in cooperation with the side faces of the forked end 85, prevent displacement of the pin and keep it in proper operating position at all times.

The end 91 of the arm 90 (Figs. 2 and 10) of the bell crank 80 is reduced in width to receive the correspondingly forked end 93 of the arm 94 of the bell crank 81. The reduced end 91 is provided with a hole to receive its pin 87, identical with the pin 87 already described, the flattened ends 88 of which are slidingly fitted into the slots 95 in the forked end 93 of the arm 94, and the two bell cranks 80 and 81 are thus operatively connected with each other for simultaneous movement.

The arm 96 of the bell crank 81 is adapted to be moved inward by any suitable means, and the arrangement is preferably such that the bell cranks 81 for both movable abutments 40 are moved inward by a common member so that the abutments 40 are equally and simultaneously moved. As here shown, the arm 96 is provided adjacent its end with a raised portion 97 of partially arcuate contour which is adapted to slidingly bear against the inner end of a reduced rod 98 (Fig. 2) extending inward from an adjusting piston 99 reciprocable in an adjusting cylinder 101, said piston 99 being provided with a suitable packing 100 to prevent leakage of fluid from the adjusting cylinder. With this arrangement inward movement of the adjusting piston 99 causes the bell cranks 80 and 81 to swing about their pivotal mountings and move both movable abutments 40 inward to reduce the stroke and output of the pump. Outward movement of the adjusting piston 99 permits the bell cranks to swing about their pivotal mountings in the opposite directions (i. e. opposite to the directions of their swinging when the adjusting piston 99 moves inward) and the movable abutments 40 are moved outward by the internal pressure of the fluid in the pump and the spring 70 as far and as rapidly as permitted by outward movement of the adjusting piston 99.

The position and movement of the adjusting piston 99 thus controls the position and movement of the bell cranks 80 and 81 and of both movable abutments 40. Inward movement of the adjusting piston 99 is effected by admitting pressure fluid to adjusting cylinder 101 through the passage 102 and its connected conduit 103, such pressure fluid being supplied by any suitable source, not shown. Outward movement of the adjusting piston 99 is accomplished by permitting exhaust of fluid from the adjusting cylinder 101, the fluid being forced out of said cylinder by the adjusting piston 99 under influence of the outward force transmitted thereto by the bell cranks from the abutments 40 and being provided by the action of pressure fluid on the inner ends of said abutments 40 and by springs 70. Admission of pressure fluid to the adjusting cylinder 101 and exhaust of fluid therefrom may be regulated by any appropriate control means, not shown, which form no part of the present invention and a number of which are well known in the art.

This novel and improved adjusting and control means has many advantages. For example, it is entirely housed within the enclosing casing of the pump, as already mentioned. It provides simultaneous and equal movement of the two movable abutments 40, thus accurately regulating the output of the pump and assuring equal strokes of the vanes at both of the abutments 40 to thereby provide substantially equal and opposite torques at opposite sides of the rotor which form a couple. It also makes it possible to provide substantially "straight line" relationship between movement of the adjusting piston 99 and the movable abutments 40; upon any movement of the adjusting piston 99 and movable abutments 40, one bell crank 80 or 81 of each pair will swing about its pivot in a clockwise direction and the other will swing in a counter-clockwise direction, so that variation from the "straight line" relation that might be due to angular movement of one bell crank is substantially compensated and balanced by the opposite angular movement of the other bell crank.

Simple and novel means are also provided for limiting as desired the minimum stroke position to which the movable abutments 40 may be moved by the adjusting piston 99. Referring to Fig. 2, the casing 10 is provided with a limit screw 105 having a lock nut 106 and a sealing cap 107. The inner end of the limit screw 105 is adapted to engage the reduced end 91 of the bell crank 80 when said bell crank has moved to its position corresponding to the desired maximum inward position and minimum stroke of the movable abutment 40, which minimum stroke may be altered at will by merely adjusting the limit screw 105 and without disturbing any other part of the pump. Since the limit screw 105 limits the outward swinging movement of the bell crank arm 90, it also acts to limit the maximum inward position to which the adjusting piston 99 can be moved by action of pressure fluid on the outer end thereof and, because both movable abutments 40 are moved inward and their outward position controlled by said adjusting piston, the limit screw also serves to limit the minimum stroke of both of said abutments 40. The load imposed on the limit screw 105 is not excessive when it engages the bell crank's arm 90 to thus limit the minimum stroke of the two abutments 40, this load being only the difference between the inward force exerted on the adjusting piston 99 by action of pressure fluid on the outer end thereof and the combined forces exerted on both abutments 40 by action of internal pump pressure on their inner ends and by the springs 70.

Another important feature of the present invention is that the pump is easy to assemble and its parts are readily accessible for inspection and replacement. In assembly, the shaft 18 is first put into place. All of the vane track elements, the springs 70, bell cranks 80 and 81 and the casing cheek plate 26 are then assembled on the spacer ring 20 while said spacer ring is out of the casing 10; the spacer ring 20 and parts carried thereby may then be put into place in the casing 10 as an assembled group or unit. The rotor 15 and vanes 17 are next put into place, followed by the end head cheek plate 27 and the cavity in the casing 10 is closed by fastening the end head 11 to the casing 10. The adjusting piston 99 is next inserted and the adjusting cylinder 101 is closed by its cover 104. All of the vane track elements, the rotor 15 and vanes 17 may be inspected by merely removing the end head 11 and end head cheek plate 27. If desired, the spacer ring 20 and all parts carried thereby may be removed for inspection or placement without disturbing the connections between the pump and the inlet pipe 68, outlet pipe 69 or conduit 103, it being merely necessary to remove the end head 11, end head cheek plate 27, rotor 15, vanes 17 and adjusting piston 99. All working parts are thus quickly and conveniently accessible.

In the embodiment hereinbefore described each link member 50 of the vane track assembly has an extensible connection with the adjacent fixed abutment 30 and also has a pivotal mounting near its end adjacent the corresponding movable abutment 40, this pivotal mounting being carried by the movable abutment 40 and hence having a fixed positional relation thereto. This arrangement is preferred because of its simplicity and it is now thought that it will answer requirements in a majority of instances, but numerous modifications may be made. For example, the pivotal mounting of the link may be arranged to have a changing positional relation with both the fixed and movable abutments. An arrangement of this character is illustrated in Figs. 12, 13 and 14 in which the modified vane track elements are illustrated in connection with a modified annular spacer ring 120, the latter being shown in section with parts thereof broken away for convenience in illustration.

The modified vane track elements shown in Figs. 12–14 include a pair of modified movable abutments 140 mounted opposite one another in parallel slideways formed in the modified spacer ring 120 and a pair of modified fixed abutments 130 (one of which is shown in Figs. 12 and 13) which are likewise mounted in suitable recesses at the vertical center line of the spacer ring 120 and are held in place by screws 31. The modified vane track elements also include four substantially rigid interconnecting track members or links 150 (two of which are shown in Fig. 12) which extend between and connect the track surfaces of the abutments in the manner illustrated in Fig. 12, the arrangement being generally the same in this respect as that of the embodiment previously described. The interior or vane contacting surfaces of the movable abutments 140, fixed abutments 130 and links 150 may have the same contours as those described in connection with the embodiment of Figs. 1–11, but the portion of the track surface 57 near the end of the link adjacent the fixed abutment may frequently be provided with a greater curvature than in the embodiment of Figs. 1–11 above mentioned.

The movable abutments 140 are in most respects the same as the movable abutments 40 previously described and the parts of said abutments 140 similar to corresponding parts of said abutments 40 will be referred to by the same reference numerals used in connection with the latter. It will be noted, however, that the vertical dimension of each of the modified movable abutments 140 is greater than that of the abutments 40, this difference in vertical dimension providing reduced end portions 142 of the modified movable abutments 140 whose vertical dimensions exceed those of the reduced end portions 42 of the movable abutments 40 for a purpose that will be explained subsequently.

The fixed abutments 130 are provided with reduced end portions 134 which extend from the central portion 132 (Fig. 13) and which are conveniently provided with a "full stroke cam surface" 36. It will be observed that the reduced end portions 134 extend from the sealing arc 32 in generally horizontal and circumferential directions for a distance greater than that of the arms 34 of the fixed abutments 30 and each reduced end portion 134 is provided with a hole to receive a pin 135, these pins 135 being shown in place on said reduced end portions 134 in Fig. 13.

Each link 150 is formed at both its ends with forks 151 and 152 (Fig. 13) respectively which are arranged to receive the reduced end portions 142 and 134 respectively of the movable abutments 140 and fixed abutments 130, the track surface on the forked ends of the link 150 overlapping the track surface on said reduced end portions 142 and 134 in all positions of adjustment of the track elements. Each link 150 is provided with a pivotal mounting which is preferably positioned near the end of said link adjacent the corresponding movable abutment 140. In this embodiment this pivotal mounting is provided by a short forked arm 154 extending from the outer surface of the link 150 and having a hole for a pin 153 which also extends through the adjacent end of a member 160 which for convenience is termed the "rocking lever." Each rocking lever 160 extends into its corresponding recess 125 formed in the modified spacer ring 120 and is pivotally mounted on the side walls of said recess by a pin 161 which extends through said rocking lever 160 and into appropriate holes in said side walls as will be understood from Fig. 12.

Each end of the link 150 is guided and the track surface thereon is positioned relative to the over-lapping track surface on the contiguous abutments by means of a cam or guide surface formed on one of the elements and by a member or surface carried by the other of the elements and which is adapted to contact said guide or cam surface; that is to say the cam or guide surface may be carried by the abutment and the contact member or surface may be carried by the adjacent end of the link 150, or vice versa. In this embodiment the cam or guide surfaces are carried by the ends of the link 150 and comprise cam surfaces 157 and 158 respectively (Fig. 13) formed on the outer surface of said links at its forked ends contiguous the corresponding movable abutment 140 and fixed abutment 130 respectively. The cam surfaces 157 and 158 are arranged to contact the pins 145 and 135 respectively which are carried by the movable abutments 140 and fixed abutments 130, as shown in Fig. 13, and the cam surfaces 157 and 158 are made of such contours that when they are in contact with the pins 145 and 135 respectively the portions of the track surface on the ends of the link 150 are disposed in vane-transferring relation with the overlapping track surfaces on the corresponding movable and fixed abutments at all positions of relative movement of the track elements incident to adjustment of the corresponding movable abutment 140 between its extreme inward and outward positions.

The cam surfaces 157 and 158 on each link 150 are kept in contact with their corresponding pins 145 and 135 by means of a tension spring 165 (Fig. 12) one end of which is attached to the rocking lever 160 as by a hole 164 (Fig. 13) and the other end of which is attached to a pin 166 (Fig. 12) carried by the side walls of the recess 125.

With this arrangement the spring 165 pulls the rocking lever 166 as far and as rapidly toward the corresponding movable abutment 140 as permitted by the cam surface 157 which engages the pin 145, the link 150 swinging about the pin 153 at its pivotal mounting on the inner end of the rocking lever 160 so that the cam surface 158 is kept in contact with the pin 135 on the fixed abutment 130 and thus assists in limiting the movement of the rocking lever 160 and in determining the relative position of said rocking lever 160 and said link 150 conformably with the position of the corresponding movable abutment 140. Upon outward movement of the movable abutment 140 the spring 165 immediately swings the rocking lever 160 outward or toward said movable abutment and keeps the cam surfaces 157 and 158 in contact with the pins 145 and 135 respectively, the parts occupying substantially the positions shown in the left hand half of Fig. 12 when the movable abutment 140 is adjusted to its full stroke position in which it is there shown. Upon inward movement of the movable abutment 140, the pin 145 acting against the cam surface 157 exerts force upon the link 150 which is slidingly resisted by the contact between the cam surface 158 and pin 135, so that the rocking lever 160 swings inward against the tension of the spring 165; the parts occupy substantially the positions shown in the right hand half of Fig. 12 when the corresponding movable abutment 140 is adjusted to its extreme inward or zero stroke position as there illustrated. The pivot 153 for the link 150 thus swings relative to both the movable abutment 140 and fixed abutment 130 upon change in position of said movable abutment 140 to alter the stroke of the vanes 17, the amount and direction of such swinging being conformable with the extent and direction of inward or outward adjustment of the movable abutment 140. Each link 150 is thus positioned by its swinging pivot 153 and the contacts between the cam surfaces 157 and 158 and the pins 145 and 135 respectively.

The arcuate movement of the pivot 153 for each link 150, the cam surfaces 157 and 158 and pins 145 and 135 cooperate to produce movement of the link 150 in its entirety in a general circumferential direction relative to both its corresponding movable abutment 140 and fixed abutment 130 or relative to the rotor. This will be understood from comparison of the positions of the parts shown in the left and right hand sides respectively of Fig. 12 in which it will be observed that the end of the link 150 is nearer the pumping arc 41 of its movable abutment 140 when said abutment is in its full stroke position shown at the left hand side of Fig. 12 than when the movable abutment is in its extreme inward or zero stroke position shown at the right hand side thereof. This circumferential movement may also be seen in the diagrammatic view of Fig. 14 in which the full lines show the position of the link 150 relative to its corresponding fixed and movable abutments when said movable abutment is in its zero stroke position and in which the dotted lines show the position of the link relative to these parts when its movable abutment is in its extreme outward or full stroke position. This arrangement, therefore, provides an extensible connection not only between the fixed abutment 130 and adjacent end of the link 150 but also between the movable abutment 140 and adjacent end of said link 150. It is in order to accommodate the relative movement between the link 150 and movable abutment 140, due to this generally circumferential movement of the link and change in relative position of these elements at the extensible connection between them, that the vertical dimension of the modified movable abutment 140 is made greater than the vertical dimension of the abutment 40 of Figs. 1–11 thus providing greater length of the reduced end portion 142 of the modified abutment 140 and of the portion 43 of the track surface thereon. The movement of the end 152 of the link 150 relative to the adjacent fixed abutment 130 at the extensible connection therebetween extends through a greater distance in the general direction of the track surface on said fixed abutment 130 than in the case of the extensible connection between the link 50 and fixed abutment 30 of the embodiment of Figs. 1–11, and it is for this reason that the reduced end portions 134 of the modified fixed abutments 130 extend for a greater distance than the arms 34 of the fixed abutments 30. The generally circumferential movement of each link 150 relative to its fixed abutment 130 is also greater than the horizontal or radial distance moved by the corresponding movable abutment 140 upon adjustment thereof to alter the stroke and output of the pump and the length of the trackway, and greater than the change in circumferential length of the portion of the vane track intermediate the pumping arc 41 and sealing arc 32 on the movable and fixed abutments which said link connects. It will also be observed that the track length increases at the extensible connection between the link and one of the abutments and simultaneously decreases at the extensibl connection between the opposite end of the link and the other abutment upon inward or outward adjustment of the corresponding movable abutment.

The arrangement of Figs. 12–14 provides contour to the vane track which the vanes 17 can follow under the influence of centrifugal force alone at all strokes usually employed with pumps of this character. It also provides movement and positions of the links 150 coordinated with the movement and positions of the corresponding movable abutments 140, the links 150 being moved conformably with the extent and direction of movement of the movable abutments 140, and this is accomplished without attachment of the links to either the fixed or movable abutments.

The arrangement of Figs. 12–14 further provides especially smooth vane-transferring relation and good alinement of the track surfaces of the ends of the links 150 with respect to the overlapping track surfaces on the fixed and movable abutments at the extensible connections therebetween, with little or no angular or intersecting relation between the track surfaces on said links and on said abutments at the points of vane transfer. This is particularly true at the more critical regions adjacent fixed abutments 130 where the radial velocity of the vanes is relatively low, as mentioned earlier. This improved relation between the track surfaces of the links and the abutments at their extensible connections is in part due to the greater circumferential movement of the links relative to the abutments and in part to the fact that the links are progressively "rocked" outward or toward more nearly horizontal positions as they are moved toward their positions corresponding to minimum or zero stroke position of the movable abutments 140. This outward rocking of the links 150 will be best understood by reference to the diagrammatic view of Fig. 14 in which the line A—B has been drawn tangent to the track surface at a point on the link 150 near its end adjacent the fixed abutment 130 when the link 150 is in its position corresponding to full stroke position of its movable abutment 140 and in which the line A'—B' is drawn tangent to the same point on the track surface of said link 150 when said link is in its position corresponding to zero stroke position of its movable abutment 140. The angle, designated by the letter C, between the lines A—B and A'—B' indicates the extent of rocking of the line 150 outward or in a direction generally toward a line tangent to the sealing arcs 32 upon adjustment of the corresponding movable abutment from its extreme outward position to its extreme inward position, this rocking of the link 150 taking place progressively as said movable abutment is moved inward. With this arrangement the track surface on the end 152 of the link 150 is brought into almost perfect alinement with the overlapping track surface on the fixed abutment 130 at the point of vane transfer with little or no intersecting or angular relation therebetween and smooth alinement of track surfaces is also provided at the point of vane transfer between the opposite end of the link 150 and the movable abutment 140. Two motions or components of motion are thus imparted to the link 150 upon inward or outward adjustment of its corresponding movable abutment 140, these motions or components of motion comprising respectively the rocking or tilting of the link and its movement in a general circumferential direction above described. The periphery of the rotor is indicated by the dotted circle 115 in Figs. 12 and 14.

A convenient method for determining the location of the pivot 161 for the outer end of the rocking lever 160, the length of said rocking lever 160 and contour of the cam surfaces 157 and 158 may also be best understood by reference to Fig. 14. According to this method the movable abutment 140 is first adjusted to its full stroke position, as indicated by the dotted line FS in Fig. 14, and the link 150 is likewise placed in its corresponding full stroke position and is disposed so that the track surfaces on its ends are in smooth vane-transferring relation with the overlapping track surfaces on the movable abutment 140 and fixed abutment 130; for convenience and clarity in illustration the outline of the link 150 in its full stroke position has been partially shown in dotted lines in Fig. 14 and the outline of the fixed abutment 130 has also been partially so shown in this figure. The point of pivotal connection 153 of the link 150 to the rocking lever 160 is then selected and is preferably located as close to the end of said link 150 adjacent the movable abutment 140 as permitted by constructional requirements and without interference with the corresponding movable abutment 140, as indicated by the letter D in Fig. 14; this preferred location of the pivotal connection 153 makes possible the use of a rocking lever 160 of minimum length or provides best results with a rocking lever 160 whose length exceeds such minimum. The movable abutment 140 and link 150 are then moved to their minimum or zero stroke positions, with the link disposed so that the track surfaces on its ends are in smooth vane-transferring relation with the overlapping track surfaces on the fixed and movable abutments at the points of vane transfer therebetween; the outline of the track surface of the movable abutment 140 in its minimum or zero stroke position is indicated by the dotted line MS in Fig. 14 and the outline of the link 150 in its corresponding position is partially shown in full lines. With the link 150 in its minimum stroke position, the pivotal connection 153 will then have moved to the point E in Fig. 14. A line between the points D and E, if drawn, would then represent the chord of the arc of swing of the pivotal connection 153 from its full stroke position to its zero stroke position and a line F—G is next drawn perpendicular to and bisecting said imaginary chord D—E; the chord D—E has not been drawn in Fig. 14 in order to avoid confusion with other lines of that figure and it is not necessary that said chord be drawn for purposes of construction or design. The pivot 161 for the outer end of the rocking lever 160 is preferably located on the line F—G and when so located said line F—G bisects the angle of swing of the pivotal connection 153 intermediate the points D and E. A line E—H through the point E and the center of the rotor is then drawn and extended until it intersects the line F—G. The pivot 161 for the outer end of the rocking lever 160 is then preferably located either at the intersection of the lines F—G and E—H, as in this embodiment, or at a point on the line F—G radially outward from said intersection. This preferred location of the pivot point 161 has several advantages among which is that the portion of the track surface on the link 150 adjacent the pivotal connection 153 occupies its position of closest proximity to the rotor when said link is in its position corresponding to the minimum or zero stroke position of its movable abutment 140; this preferred location also assures satisfactory co-operating action of the cams 157 and 158 and pins 145 and 135 respectively as said movable abutment 140 is adjusted inward or outward. The above described location of the pivotal connection 153 and the pivot point 161 in turn establish and determine the length of the rocking lever 160.

The contours of the cam surfaces 157 and 158 are next determined. This is accomplished by first more or less arbitrarily positioning the pins 145 and 135 on the movable abutment 140 and fixed abutments 130 respectively, preferably at points approximately as shown in Figs. 12 and 13; the pins 135 and 145 have not been shown in Fig. 14 to avoid confusion. The contours of the cams 157 and 158 are then determined by adjusting the movable abutment 140 from its extreme inward position to its extreme outward position while swinging the link 150 and the rocking lever 160 and with the track surfaces on the ends of said link 150 maintained in smooth vane-transferring relation with the overlapping track surface on the abutments at all positions of adjustment of said movable abutment 140 and at all corresponding positions of said link 150. The contour of the cams 157 and 158 may thus be said to be along lines generated by contact of the outer surface of the link with the pins 145 and 135 respectively as said link is moved in unison and conformably with its movable abutment 140 while continuously maintaining the overlapping track surfaces on the ends of the link and on the abutments in smooth vane-transferring relation with one another.

The method above described provides excellent vane-transferring relation and alinement between the track surfaces of the track elements at the overlapping extensible connections between them. At positions of the track elements corresponding to the full stroke and zero or minimum stroke positions of the movable abutments 140 the vane-transferring relation and alinement of the track surfaces at the points of vane transfer are practically perfect and, although the arcuate movement of the swinging pivot 153 theoretically results in less perfect alinement at intermediate strokes, the resulting departures are so slight that they are almost undiscernible by inspection and the relation of the track elements to one another at all strokes is such as to provide particularly smooth vane action and highly satisfactory operation of the pump.

When the modified track elements of Figs. 12–14 are employed with the improved adjusting and control means shown in Figs. 1, 2, 10 and 11, it is necessary to increase the outer diameter of the spacer ring, and hence the diameter of the casing, in order to provide a spacer ring such that the inner recesses 125 thereof for the rocking levers 160 would not extend into and connect with the outer circumferential recess 24 for the parts of the improved adjusting and control means of Figs. 1, 2, 10 and 11. For convenience of illustration, therefore, the modified spacer ring 120 and modified track elements of Figs. 12–14 are shown as adapted for use with conventional adjusting and control means of any preferred type. As shown in Fig. 12 each modified movable abutment 140 is provided with an adjusting rod 180 which is operatively connected with its abutment as by a threaded connection 181 shown in dotted lines and which extends through an appropriate opening in the modified spacer ring 120 and in the modified enclosing casing (not shown). The end of each adjusting rod 181 is flattened as at 182 to receive the forked end of a link 184 and the two parts are connected as by a pin 183. The links 184 may be attached to any appropriate conventional adjusting and control means, several of which are known in the art.

Figs. 15, 16 and 17 illustrate modified vane track elements and a modified spacer ring which are generally similar in many respects to the corresponding elements shown in Figs. 12–14, differing from the latter only in certain important respects to be explained. The movable abutments 140 of Figs. 15-17, for example, are identical with the movable abutments 140 of Figs. 12-14 and the modified fixed abutments 230 of Figs. 15-17 differ from the fixed abutments 130 only in that the pins 135 of said fixed abutments 130 are omitted as they are not required in this modification. The modified spacer ring 220 of Figs. 15-17 is also the same as the spacer ring 120 of Figs. 12-14 except for the size and shape of the internal recesses 225 for the inner ends of the rocking levers.

The modified links 250 of Figs. 15-17 are the same as the links 150 of Figs. 12-14 except that the cam surfaces 158 on the end of the link adjacent the fixed abutments are omitted in the modified links 250 and also in that the outer surface of each modified link 250 is provided not only with a short forked arm 154 but also with another short forked arm 254 which is preferably disposed as near as practical to said arm 154.

Each modified link 250 is pivotally supported upon its short arms 154 and 254 by means of pins 153 and 253 respectively carried by the inner ends of a pair of rocking levers 160 and 260 respectively. The rocking lever 160 of Figs. 15-17 and its associated parts may be the same as described in connection with Figs. 12-14 and are approximately so shown, hence require no further description. The inner end of the rocking lever 260 is pivotally connected to the short arm 254 extending from the outer surface of the link 250 by means of a pin 253 as above stated and the outer end of said rocking lever 260 is pivotally supported by a pin 261 extending therethrough and into the side walls of the spacer recess 225 of the spacer ring 220.

In designing vane track elements of the character shown in Figs. 15-17, the location of the pivot point 253 may be arbitrarily chosen within certain limits but it is preferable to position it as close as practical to the pivot point 153, which is preferably first located as hereinbefore explained, in order that the length of the rocking lever 260 may be kept to the minimum and also to assure that the short arm 254 will not strike the fixed abutment 230 when the link 250 is in its position corresponding to the minimum or zero stroke position of its movable abutment 140. A slight change in the location of the pivot point 253 will make a considerable difference in the length of the rocking lever 260, as may be judged by the relative lengths of the rocking levers 160 and 260. The location of the pivot point 261 and the length of the rocking lever 260 are determined in the same manner as already described in connection with the rocking lever 160 of Figs. 12-14 and will be understood from that description and from the construction lines therefore shown in Fig. 17 without further explanation. It is desirable, however, that the location of the pivot point 261 for the outer end of the rocking lever 260 shall be in conformity with the location of the pivot point 161 for the outer end of the rocking lever 160 in order to assure proper movement of the link 250 and proper relation of the track surfaces thereon that overlap the track surfaces on the fixed and movable abutments at the extensible connections between them. For example, as shown in Fig. 17 the pivot point 161 is located at the intersection of the lines F—G and E—H and the pivot point 261 is similarly located at the intersection of the corresponding lines FF—GG and EE—HH; selection of another location for the pivot point 161, for example at a point radially outward from the intersection of the lines F—G and E—H, would require corresponding outward movement or location of the pivot point 261 for best results. The location of the pivot points 161 and 261 in conformity with one another is preferred although acceptable but perhaps less perfect results may be obtained with other arrangements.

The functioning of the arrangement of Figs. 15-17 is generally the same as that explained in connection with the embodiment of Figs. 12-14. Each link 250 is moved conrformably with the extent and direction of the inward or outward movement of its corresponding movable abutment 140 and the approximate relative positions of the parts when the corresponding movable abutment is at its full stroke position may be observed in the left hand side of Fig. 15 and the positions of the parts when the corresponding movable abutment is in its minimum or zero stroke position may be observed in the right hand half of that figure. Each link 250 has an extensible connection both with its fixed abutment 230 and movable abutment 140 and said link moves in a generally circumferential direction relative to both of said abutments, with its movement relative to the fixed abutment exceeding both the radial distance moved by the movable abutment 140 and the corresponding change in the circumferential length of the vane track intermediate the corresponding pumping arc 41 and sealing arc 32. The link 250 is also progressively rocked outward as it is moved toward its position corresponding to minimum or zero stroke position of its movable abutment in the same general manner and to substantially the same extent as in the embodiment of Figs. 12-14 so that two motions or components of motion are thus imparted to the link 250. The path of movement of each link 250 is determined, however, by its pivotal mountings and its rocking levers 160 and 260, and the extent of its movement in this path is determined by the cam surface 157 and the pin 145 on its movable abutment 140. The path and extent of movement of the link 250 thus co-operate to determine its position so that no cam surface is required for positioning the track surface on the end of the link adjacent the fixed abutment with respect to the overlapping track surface on said fixed abutment, smooth vane-transferring relation at the extensible connection being provided by action of the rocking levers and pivotal mountings.

The modified vane track elements illustrated in Figs. 18 to 22 inclusive provide between the interconnecting track members or links and the fixed and movable abutments thereof substantially the same relative movement and positional relations as is provided by the embodiments of Figs. 12-14 and Figs. 15-17 but in the arrangement of Figs. 18-22 the movement and position of the links are controlled and effected by novel means comprising for each link a pin or guided member carried by the link and two co-operating cam or guide slots or guideways therefor, one a stationary guide slot and the other a guide slot carried by the movable abutment. In the present instance the stationary guide slots are formed in the cheek plates as will be presently explained.

The modified vane track elements of Figs. 18-22 include a pair of oppositely positioned modified movable abutments 340, a pair of oppositely positioned modified fixed abutments 330 (one of which is shown in Fig. 18) and four interconnecting track members or links 350 (two of which are shown in Fig. 18). The general arrangement of these parts relative to each other is similar to that of the embodiments previously described and will be understood from Figs. 18 and 19.

The modified fixed abutments 330 are here shown as identical with the fixed abutments 30 of Figs. 1–11 except that the arms 334 of the abutments 330 extend from the sealing arcs 32 in horizontal and generally circumferential directions for distances greater than in the case of the arms 34 of said fixed abutments 30. The greater horizontal and generally circumferential lengths of the arms 334 is to accommodate the movement of the adjacent ends of the links 350 with respect to the fixed abutments 330, the relative movement between these parts at their extensible connections exceeding the corresponding relative movements between the links 50 and fixed abutments 30 of the embodiment of Figs. 1–11 in the same manner and to substantially the same extent as explained in connection with the modification of Figs. 12–14.

The modified links 350 are also similar to the links 50 of the embodiment of Figs. 1–11 from which each of them differs principally in that the slot at the forked end 351 extends into the link 350 for a distance greater than that of the slot at the forked end 51 of said link 50, in order to provide for the extensible connection between the link 350 and its movable abutment 340, and also the length of the tongue 352 of the link 350 exceeds that of the tongue 52 of the link 50 in order to accommodate the greater movement of the link 350 relative to its fixed abutment 330 at the extensible connection therebetween. It will be observed that the pin 353 which is carried by the arms 354 at the forked end 351 of each link 350 extends beyond the side edges of said link for a purpose which will presently appear.

The movable abutments 340 are shown as similar to the abutments 140 of Figs. 12–14 from which they differ principally in that each abutment 340 is provided on each of its reduced end portions 342 with a cam or guide slot 355 for the pin 353 to be more fully described subsequently.

The modified vane track elements of Figs. 18–22 have been shown in connection with a fragmentary side or end elevation of a modified spacer ring 320 (Fig 18) which is generally similar to the spacer ring 120 of Figs. 12–14 except that no inner recesses are required The vane track elements of this embodiment may also be employed, however, with a spacer ring 20 shown in Figs. 1 and 2 together with the improved adjusting and control means of Figs 1, 2, 10 and 11 without appreciable increase in the outer diameter of said spacer ring 20 or of the enclosing casing.

Modified cheek plates are also employed with this embodiment of the vane track elements, the arrangement of which will be understood from Fig. 20 which shows an elevation of the inner or rotor face of a modified casing cheek plate 326 which is identical with the casing cheek plate 26 of Fig. 4 except in particulars now to be explained; the modified casing cheek plate 326 is also partially shown in Fig. 18. Referring to Fig. 20, the modified casing cheek plate 326 is provided with a pair of modified inlet ports 328 and a pair of modified outlet ports 329 which are provided at the ends thereof adjacent the horizontal center line with shallow recesses or port extensions 328' and 329' respectively. The arrangement is such that the combined circumferential lengths of the modified inlet ports 328 and their port extensions 328' are substantially the same as the circumferential lengths of the inlet ports 28 of the cheek plate 26 (Fig. 4), and hence said inlet ports 328 and their port extensions 328' supply fluid to the outer ends of the vanes 17 as they approach the pumping arcs 41. Similarly, the combined circumferential lengths of the modified outlet ports 329 and their port extensions 329' are substantially the same as the circumferential lengths of the outlet ports 29 of the cheek plate 26, so that fluid is discharged therethrough by the outer ends of the vanes 17 as they recede from the pumping arcs 41. The modified cheek plates are also each provided with four cam or guide slots 325, one of which is disposed adjacent the closed end of each of the port extensions 328' and 329' as will be understood from Fig. 20. The guide slots 325 are adapted to engage the ends of the pins 353 and hence are made deeper (relative to the rotor face of the cheek plates) than the port extensions, as will be best understood from the fragmentary view of Fig. 22. It will also be understood that the end head cheek plate 327 for use with the vane track elements of this embodiment is similarly and correspondingly modified to provide port extensions and guide slots mating with those of the casing cheek plate 326 as will also be understood from the fragmentary view of said cheek plates 326 and 327 in Fig. 22.

With this arrangement each link 350 is moved in a generally circumferential direction relative to both its fixed abutment 330 and its movable abutment 340, such movement being conformable with the extent and direction of the radial adjustment of said movable abutment 340 and being effected by its pin 353 in conjunction with the corresponding guide slots 325 and 355. This is accomplished by disposing the guide slots 325 and 355 in such relation to the reduced end portions 342 of the movable abutments 340 and in such relation to each other that together with the pins 353 they function to product the desired movement and positioning of the links 350 relative to the movable abutments 340 Each guide slot 355 is accordingly arranged to permit sliding movement of pin 353 therein so that the corresponding link 350 may move in a generally circumferential direction relative to the track surface on the corresponding movable abutment 340, and each of said slots 355 is also so arranged that in all positions of said link 350 the track surface on or near the end of said link 350 is kept in smooth vane-transferring relation with the overlapping track surface on said movable abutment at the point of vane transfer. In other words, each guide slot 355 may be said to be positioned along the line generated by movement of the pin 353 when the vane contacting surface of the link 350 is maintained in vane-transferring relation with the vane-contacting surface on its corresponding movable abutment 340 at the extensible connection there-between and when said link 350 and pin 353 are moved progressively and conformably toward the pumping arc 41 as said movable abutment 340 is adjusted from its zero stroke position to its full stroke position, with the end of said link 350 adjacent the fixed abutment 330 being guided by the pin 55 in the slots 35. A line so generated has, theoretically, a slight curvature but this curvature is so small that in practice it often may be neglected and the guide slot 355 may be straight as in this embodiment. In one aspect, therefore, the function of each guide slot 355 may be said to be to permit movement of the link 350 in its extensible connection with the movable abutment 340, to position the track surface on the end of the link in vane-transferring relation with the over-lapping track surface of said abutment and, through the pin 353, to impart movement to the link conformably with inward or outward adjustment of said movable abutment 340.

The guide slots 325 are adapted to cause each pin 353 to move progressively and conformably in its guide slot 355 toward the pumping arc 41 as the corresponding movable abutment 340 is moved toward its full stroke position, and vice versa. The guide slots 325 may thus be said to be positioned on the lines generated by the pins 353 when said pin 353, its link 350 and its movable abutment 340 are moved in the manner above stated. In practice the guide slots 325 may be conveniently located by determining the positions of the pin 353 at the positions of the link 350 corresponding to the full stroke and zero stroke positions of its movable abutment 340 and by then connecting the points thus located with a slot having a sliding fit with said pin 353. The approximate relation of the guide slots 325 and 355 relative to each other and to the other parts will be understood from the enlarged fragmentary views of Figs. 21 and 22.

With the arrangement of Figs. 18-22, therefore, each pin 353 is moved both in its guide slot 355 and its guide slots 325 upon inward or outward movement of its movable abutment 340, and it will be observed that said pin 353 can occupy only one position for any given position of its movable abutment. The link 350 through its connection with the pin 353 is thus moved relative to the movable abutment 340 at the extensible connection there-between, its movement being conformable with the movement of said abutment, and said link 350 is also moved relative to its fixed abutment 330 at the extensible connection between them, the link also being "rocked" outward as the circumferential length of the trackway is decreased upon inward movement of its movable abutment; two motions or components of motion are thus simultaneously imparted to the link 350. The movement of the link relative to the fixed abutment 330 exceeds the radial movement of the abutment 340 and also exceeds the change in circumferential track length intermediate the pumping arc 41 and sealing arc 32 by an amount approximately equal to the movement of the link 350 relative to its movable abutment 340 at the extensible connection between them. The guide slots 325 and 355 together with the pin 353 thus provide for the end of the link 350 adjacent the movable abutment 340 a pivotal mounting that is movable with respect to both the corresponding fixed and movable abutments.

The relative positions of the track elements corresponding to full stroke and zero stroke positions of the movable abutments may be observed in Fig. 18, the left hand half of which shows the abutment 340 in its full stroke position and the right hand half of which shows the abutment 340 in its zero stroke position.

While the present invention has been described as a pump it is also suitable for use as other types of fluid pressure device, such, for example, as a fluid motor and it will function as a fluid motor if supplied with pressure fluid for its operation but the cycle of operation will, of course, be reversed. When employed as a motor it is necessary to introduce means tending to hold the vanes 17 radially outward in contact with the vane track, particularly if the motor is to be operated at low speeds.

It will be understood that the foregoing are merely exemplifying disclosures and that changes, some of which have been indicated, may be made without departing from applicants' invention which is defined in the appended claims. For example considerable latitude is permissible in the contour of the track surface on the several vane track elements, and this also is true of the "straightening," "rounding-off" or other forms of easement of the track surfaces at the extensible connections between the track elements. Also, certain individual features of the vane track elements of one embodiment may be employed with other features shown in other embodiments; for example, the arrangement of the extensible connection at the fixed abutment of the embodiment of Figs. 18-22 may be used with the movable abutment and arrangement of pivotal mounting and overlapping track surfaces therefor shown in the embodiment of Figs. 12-14, etc.

In all embodiments, the constructions and arrangements are relatively simple, are capable of large scale production with assured interchangeability of parts and will provide dependable operation of the device. In all embodiments each interconnecting track member has an extensible connection with its adjacent fixed abutment, thereby making possible the use of contours of the vane track which the vanes can follow under the influence of centrifugal force alone, as earlier stated, and which provide improved operation of the pump or motor even though centrifugal force is not alone relied upon for moving the vanes radially outward as they pass through the inlet areas. All embodiments also provide a pivotal mounting for each link at the end thereof adjacent its corresponding movable abutment, and in several of the embodiments this pivotal mounting is movable with respect to both the fixed and movable abutments which are connected by the link, with outward rocking of the link to provide improved alinement of its track surface with the track surface on the adjacent fixed abutment at the point of vane transfer.

I claim:

1. In a rotary fluid pressure device of variable capacity, a rotor, a plurality of vanes movable inwardly and outwardly of the rotor, a trackway for the vanes comprising a stationary track element, a track element movable to vary simultaneously the capacity of the device and the length of the trackway and a link member arranged to connect said track elements in all positions of said movable track element, said link member having a pivotal mounting disposed near the end thereof adjacent the movable track element and having an extensible connection with said stationary track element, the entire vane-contacting surface of said link member being of fixed contour, and means for moving said movable track element.

2. In a rotary fluid pressure device of variable capacity, a rotor, a plurality of vanes movable inwardly and outwardly of the rotor, a trackway for the vanes comprising a stationary track element, a track element movable to vary simultaneously the capacity of the device and the length of the trackway and a link member arranged to connect said track elements in all positions of said movable track element, said link member having a pivotal mounting on said movable track element and an extensible connection with said stationary track element, the entire vane-contacting surface of said link member being of fixed contour, and means for moving said movable track element.

3. In a rotary fluid pressure device of variable capacity, a rotor having a plurality of vanes movable inwardly and outwardly thereof, a trackway for said vanes comprising a fixed abutment, an abutment movable to vary simultaneously the capacity of the device and the circumferential length of the trackway and a link member disposed intermediate said abutments and arranged to connect them in all positions of said movable abutment, said link member having a pivotal mounting movable with respect to said fixed abutment as said movable abutment is moved and having an extensible connection with said fixed abutment, the entire vane-contacting surface of said link member being of fixed configuration, and means for moving said movable abutment.

4. In a rotary vane type fluid pressure device of the class described, a vane trackway comprising a fixed abutment, a movable abutment and an interconnecting track member having at each end a joint with one of said abutments including overlapping track surfaces, pivot means for maintaining the track surface of one end of the interconnecting track member in vane-transferring relation with the track surface of the movable abutment at all positions of adjustment of said movable abutment, sliding means for maintaining the track surface of the opposite end of said member in vane-transferring relation with the track surface of the fixed abutment, and means for moving said movable abutment.

5. In a multi-section fluid pressure device of variable capacity, a pair of oppositely disposed elements movable in substantially opposite directions to alter the capacity of said device and means for simultaneously and oppositely moving said elements comprising a first pair of pivotally mounted members, an operative connection between one of said members and one of said elements, an operative connection between the other of said members and the other of said elements, a second pair of pivotally mounted members arranged to swing in directions opposite to those of said first pair of members, an operative connection between one member of said first pair and one member of said second pair, an operative connection between the other of said members of the first pair and the other member of said second pair, and means for simultaneously moving both members of said second pair.

6. In a vane type fluid pressure device of variable capacity comprising two fluid sections, a rotor and vane assembly including a rotor having a plurality of vanes movable inwardly and outwardly thereof, a vane trackway for said vanes comprising a plurality of track elements including a pair of abutments movable in substantially opposite directions relative to the rotor to alter the capacity of the device, a spacer ring surrounding the rotor and vane assembly and supporting the elements of said trackway and means for simultaneously and oppositely moving said abutments comprising a first pair of members pivotally mounted on said spacer ring, one of said members being disposed adjacent each of said abutments and having a slidable pivotal connection with the corresponding abutment, a second pair of members pivotally mounted on said spacer ring, one of said members of said second pair being disposed adjacent each member of said first pair and having a slidable pivotal connection with the corresponding member of said first pair, and means common to both members of said second pair for moving them simultaneously and oppositely about their pivotal mountings to produce simultaneous movement of said abutments in substantially opposite directions.

7. In a vane type fluid pressure device of variable capacity comprising two fluid sections, a rotor having a plurality of vanes movable inwardly and outwardly thereof, a vane trackway for said vanes comprising a plurality of track elements including a pair of diametrically opposed abutments movable in opposite directions relative to the rotor to alter the capacity of the device, spring means for moving said abutments in one of the directions of their movement, hydraulic piston means for limiting the distance through which said abutments are permitted to be moved in said first named directions by said spring means and for moving said abutments in the opposite directions of their movement in opposition to said spring means and operative connections between said abutments and said hydraulic piston means including for each abutment a pair of oppositely swinging bell cranks operatively connected with each other, one of said bell cranks having an operative connection with said abutment and the other having an operative connection with said hydraulic piston means.

8. In a rotary fluid pressure device of variable capacity, a rotor having a plurality of vanes movable inward and outward thereof, a trackway of variable circumferential length for said vanes, said trackway including a first abutment, a second abutment, at least one of said abutments being movable with respect to the other to simultaneously vary the capacity of the device and the circumferential length of said trackway, the length of said trackway increasing as the capacity of the device is increased, and intermediate track means having an extensible connection with each of said abutments and adapted to connect said abutments in all positions of relative movement therebetween, and means for moving at least one of said abutments with respect to the other.

9. In a rotary fluid pressure device of variable capacity, a rotor having a plurality of vanes movable inward and outward thereof, a trackway of variable circumferential length for said vanes, said trackway including a first abutment, a second abutment, at least one of said abutments being movable with respect to the other to simultaneously vary the capacity of the device and the circumferential length of said trackway, and at least one intermediate track member disposed intermediate said abutments and movable with respect to both of said abutments, the entire vane-contacting surface of said intermediate track member having a fixed configuration, pivotal mounting means for said intermediate track member, said pivotal mounting means being movable with respect to both of said abutments and means for moving at least one of said abutments with respect to the other.

10. In a rotary fluid pressure device of variable capacity, a rotor having a plurality of vanes movable inward and outward thereof, a trackway of variable circumferential length for said vanes, said trackway including a first abutment, a second abutment, at least one of said abutments being movable with respect to the other to simultaneously vary the capacity of the device and the circumferential length of said trackway, and at least one intermediate track member disposed intermediate said abutments and movable with respect to both of said abutments, the entire vane-contacting surface of said intermediate track member having a fixed configuration, pivotal mounting means for said intermediate track member movable with respect to both of said abutments, said last named means comprising at least one rocking lever having one end pivotally connected with said intermediate track member and the other end provided with a pivotal mounting of fixed location, and means for moving at least one of said abutments with respect to the other.

11. In a rotary fluid pressure device of variable capacity, a rotor having a plurality of vanes movable inward and outward thereof, a trackway for said vanes including a first abutment, a second abutment, at least one of said abutments being movable with respect to the other to vary the capacity of the device, and an intermediate track member movable with respect to both of said abutments and adapted to connect said abutments in all positions of relative movement therebetween, the entire vane-contacting surface of said intermediate track member having a fixed configuration, pivotal mounting means for said intermediate track member movable with respect to both of said abutments, guide means at each end of said intermediate track member for maintaining the track surface thereon in vane-transferring relation with the track surface on the contiguous abutment and means for moving at least one of said abutments with respect to the other.

12. In a rotary fluid pressure device of variable capacity, a rotor having a plurality of vanes movable inward and outward thereof, a trackway of variable circumferential length for said vanes, said trackway including a stationary abutment, an abutment movable to simultaneously vary the capacity of the device and the circumferential length of said trackway and an intermediate track member movable with respect to both of said abutments and adapted to connect said abutments in all positions of relative movement therebetween, the entire vane-contacting surface of said intermediate track member having a fixed configuration, means for moving said movable abutment and means for progressively rocking said intermediate track member in a generally outward direction as the capacity of said device and the circumferential length of said trackway are progressively decreased.

13. In a rotary fluid pressure device of variable capacity, a rotor having a plurality of vanes movable inward and outward thereof, a trackway of variable circumferential length for said vanes, said trackway including a first abutment, a second abutment, at least one of said abutments being movable with respect to the other to simultaneously vary the capacity of the device and the circumferential length of said trackway, and intermediate track means having an extensible connection with each of said abutments and adapted to connect said abutments in all positions of relative movement therebetween, means for moving at least one of said abutments with respect to the other and means for moving said intermediate track means at its extensible connection with one of said abutments through a distance greater than the distance of relative movement between said abutments upon change in relative positions of said abutments.

14. In a rotary fluid pressure device of variable capacity, a rotor having a plurality of vanes movable inward and outward thereof, a trackway for the vanes comprising a stationary track element, a track element movable to vary simultaneously the capacity of the device and the length of the trackway and having a working arc thereon, and a link member arranged to connect said track elements in all positions of said movable track element and having on each of its ends an extensible connection with the contiguous track element, the end of said link member adjacent said movable track element being disposed nearest to the working arc thereon when the capacity of the device and length of the trackway are maximum and progressively moving away from said working arc as the capacity of said device and length of the trackway are decreased, and means for moving said movable track element.

15. In a rotary fluid pressure device of variable capacity, a rotor having a plurality of vanes movable inward and outward thereof, a trackway of variable circumferential length for said vanes, said trackway including a first abutment, a second abutment, at least one of said abutments being movable with respect to the other to simultaneously vary the capacity of the device and the circumferential length of said trackway, and at least one intermediate track member disposed intermediate said abutments and movable with respect to both of said abutments, the entire vane-contacting surface of said intermediate track member having a fixed configuration, means for pivotally supporting said intermediate track member comprising a plurality of rocking levers, each of said rocking levers having one end pivotally connected with said intermediate track member and on its other end having a pivotal mounting of fixed location, and means for moving at least one of said abutments with respect to the other.

16. In a rotary fluid pressure device of variable capacity, a rotor having a plurality of vanes movable inward and outward thereof, a trackway for said vanes including a first abutment, a second abutment, at least one of said abutments being movable with respect to the other to vary the capacity of the device, and intermediate track means having an extensible connection with each of said abutments and adapted to connect said abutments in all positions of relative movement therebetween, means for moving at least one of said abutments with respect to the other and means for moving said intermediate track means relative to both of said abutments upon change in relative positions of said abutments with respect to each other comprising a guided element carried by said intermediate track means and a plurality of guideways engaged by said element, at least one of said guideways being movable with respect to the other upon change in relative position of said abutments.

17. In a rotary fluid pressure device of variable capacity, a rotor, a plurality of vanes movable inwardly and outwardly of the rotor, a trackway for the vanes comprising a stationary track element, a track element movable to vary simultaneously the capacity of the device and the length of the trackway, and a link member arranged to connect said track elements in all positions of said movable track element, a guided element carried by the end of said link member adjacent said movable track element, stationary guide means for said guided element, other guide means for said guided element carried by said movable track element and arranged to cooperate with said first named guide means and with said guided element to move said link member conformably with movement of said movable track element, and means for moving said movable track element.

18. In a rotary fluid pressure device of variable capacity, a rotor having a plurality of vanes movable inward and outward thereof, a trackway of variable circumferential length for said vanes, said trackway including a first abutment, a second abutment, at least one of said abutments being movable with respect to the other to simultaneously vary the capacity of the device and the circumferential length of said trackway, the circumferential length of said trackway increasing as the capacity of the device is increased, an intermediate track means having an extensible connection with each of said abutments and adapted to connect said abutments in all positions of relative movement therebetween, means for moving at least one of said abutments with respect to the other and means responsive to relative movement of one of said abutments with respect to the other and active to conformably move said intermediate track means to thereby increase the circumferential length of the trackway at the extensible connection between said track means and one of said abutments and to simultaneously decrease the circumferential length of said trackway at the extensible connection between said intermediate track means and the other of said abutments.

19. In a rotary fluid pressure device of variable capacity, a rotor having a plurality of vanes movable inward and outward thereof, a trackway of variable circumferential length for said vanes comprising a stationary track element having a sealing arc thereon, a track element movable to vary simultaneously the capacity of the device and the length of the trackway and having a work arc thereon, interconnecting track means having an extensible connection with each of said track elements and arranged to connect said track elements in all positions of said movable track element, means for moving said movable track element and means active upon movement of said movable track element for moving said interconnecting track means to alter the track length at one of said extensible connections by an amount exceeding the change in circumferential track length intermediate the working and sealing arcs on said track elements.

20. In a rotary vane type fluid pressure device of variable capacity, a rotor having a plurality of vanes movable inward and outward relative to the rotor, a trackway for said vanes comprising a stationary track element, a track element movable to vary the capacity of the device and a track member movable with respect to both of said track elements and arranged to connect said track elements in all positions of said movable track element, the entire portion of the surface of said trackway carried by said track member being of fixed configuration, means for moving said movable track element and means active simultaneously with movement of said movable track element for imparting at least two components of motion to said track member, said components being such as to position said track member so that the portions of the trackway surface near the ends of said trackway member are disposed in vane-transferring relation with the portions of the trackway surface carried by the stationary and movable track elements respectively and so that changes in movement of the vanes relative to the rotor occur gradually as said vanes traverse the portions of the trackway surface carried by said stationary and movable track elements and by said track member.

21. In a rotary vane type fluid pressure device of variable capacity, a rotor having a plurality of vanes movable inward and outward thereof, a trackway for said vanes comprising a stationary track element, a track element movable to vary the capacity of the device and track means arranged to connect said track elements in all positions of said movable track element, said track means including at least one track member having a track surface of fixed configuration throughout, means for moving said movable track element and means active simultaneously with movement of said movable track element for imparting to said track member at least two components of motion relative to said stationary and movable track elements.

22. In a rotary vane type fluid pressure device of variable capacity, a rotor having a plurality of vanes movable inward and outward thereof, a trackway of variable length for said vanes having two contiguous members, means for simultaneously varying the capacity of the device and the length of said trackway, the length of said trackway increasing as the capacity of the device is increased, and means active simultaneously with variation in the capacity of the device and in length of said trackway for imparting two components of motion to one of said members, one of said components being in a generally circumferential direction relative to the rotor, the entire portion of the track surface carried by said member to which said two components are imparted being of fixed contour.

23. In a rotary vane type fluid pressure device of variable capacity, a rotor having a plurality of vanes movable inward and outward thereof, a trackway of variable length for said vanes having two contiguous members, the entire portions of the track surface carried by each of said members being of fixed contour, means for simultaneously varying the capacity of the device and the length of said trackway, the length of said trackway increasing as the capacity of the device is increased, and means active simultaneously with variation in the capacity of the device and in length of said trackway for imparting two components of motion to one of said members, one of said components being in a generally circumferential direction relative to the rotor, and the other of said components being a bodily rocking component of motion.

24. In a rotary vane type fluid pressure device of variable capacity, a rotor having a plurality of vanes movable inward and outward thereof, a trackway of variable length for said vanes having two contiguous members, means for simultaneously varying the capacity of the device and the length of said trackway, the length of said trackway increasing as the capacity of the device is increased, and means active simultaneously with variation in the capacity of with variation in the capacity of the device and in length of said trackway for moving one of said members in its entirety in a generally circumferential direction relative to the rotor.

25. In a rotary vane type fluid pressure device of variable capacity, a rotor having a plurality of vanes movable inward and outward thereof, a trackway for said vanes comprising a first abutment, a second abutment, each of said abutments having a portion of the trackway surface thereon and at least one of said abutments being movable with respect to the other to vary the capacity of the device, and intermediate track means having an extensible connection with each of said abutments and adapted to connect said abutments in all positions of relative movement therebetween, said intermediate track means being movable in a generally circumferential direction relative to the track surfaces on both of said abutments as the capacity of the device is varied, means for moving at least one of said abutments with respect to the other and means coordinating said movement of said intermediate track means with the extent and direction of the relative movement between said abutments.

26. In a rotary fluid pressure device of variable capacity, a rotor having a plurality of vanes movable inward and outward thereof, a trackway of variable circumferential length for said vanes, said trackway comprising a first abutment, a second abutment, at least one of said abutments being movable with respect to the other to simultaneously vary the capacity of the device and the circumferential length of said trackway, the length of said trackway increasing as the capacity of the device is increased, and at least one intermediate track member disposed intermediate said abutments and movable with respect to both of said abutments, the entire vane-contacting surface of said intermediate track member having a fixed contour, pivotal mounting means for said intermediate track member, said pivotal mounting means being movable with respect to both of said abutments, means for moving at least one of said abutments with respect to the other and means for moving said pivotal mounting means conformably with the extent and direction of relative movement between said abutments.

27. In a rotary fluid pressure device of variable capacity, a rotor having a plurality of vanes movable inward and outward thereof, a trackway of variable circumferential length for said vanes, said trackway comprising a stationary abutment, an abutment movable to simultaneously vary the capacity of the device and the circumferential length of said trackway, and at least one intermediate track member disposed intermediate said abutments and movable with respect to both of said abutments, the entire vane-contacting surface of said intermediate track member having a fixed contour, supporting means for said intermediate track member, said supporting means being movable with respect to both of said abutments, means for moving said movable abutment and means operative simultaneously with movement of said movable abutment for moving said supporting means in a direction and to an extent corresponding to the direction and extent of movement of said movable abutment.

28. In a rotary fluid pressure device of variable capacity, a rotor having a plurality of vanes movable inward and outward thereof, a trackway of variable circumferential length for said vanes, said trackway comprising a first abutment, a second abutment, at least one of said abutments being movable with respect to the other to simultaneously vary the capacity of the device and the circumferential length of said trackway, and at least one intermediate track member disposed intermediate said abutment and movable with respect to both of said abutments, the entire vane-contacting surface of said intermediate track member having a fixed contour, supporting means for said intermediate track member, said supporting means being movable with respect to both of said abutments simultaneously with variation in the capacity of said device and in the circumferential length of said trackway, and means for moving at least one of said abutments with respect to the other.

29. In a rotary fluid pressure device of variable capacity, a rotor having a plurality of vanes movable inward and outward thereof, a trackway of variable circumferential length for said vanes, said trackway comprising a first abutment, a second abutment, at least one of said abutments being movable with respect to the other to simultaneously vary the capacity of the device and the circumferential length of said trackway, the length of said trackway increasing as the capacity of the device is increased, and intermediate track means having an extensible connection with each of said abutments and adapted to connect said abutments in all positions of relative movement therebetween, means for moving at least one of said abutments with respect to the other and means for moving said intermediate track means conformably with the direction and extent of relative movement between said abutments.

30. In a rotary vane type fluid pressure device of variable capacity, a rotor having a plurality of vanes movable inward and outward thereof, a trackway of variable circumferential length for said vanes, said trackway including a fixed abutment, an abutment movable to vary the capacity of said device and intermediate track means having an extensible connection with each of said abutments and adapted to connect said abutments in all positions of said movable abutment, means for moving said movable abutment and means for moving said intermediate track means simultaneously with the movement of said movable abutment and relative to both of said abutments comprising a plurality of cooperating guide means operatively connected with said intermediate track means including stationary guide means and guide means movable in unison with said movable abutment.

31. In a rotary vane type fluid pressure device of variable capacity, a rotor having a plurality of vanes movable inward and outward thereof, a trackway of variable length for said vanes, said trackway including a fixed abutment, an abutment movable to vary the capacity of said device and intermediate track means having an extensible connection with each of said abutments and adapted to connect said abutments in all positions of said movable abutment, means for moving said movable abutment and means for moving said intermediate track means simultaneously with the movement of said movable abutment and relative to both of said abutments comprising a guided member carried by said track means at the end thereof adjacent said movable abutment, a stationary guideway engaging one portion of said guided member and another guideway carried by said movable abutment and engaging another portion of said guided member.

CHARLES M. KENDRICK.
IVAN A. KAZINE.